(12) United States Patent
An et al.

(10) Patent No.: US 11,614,656 B2
(45) Date of Patent: Mar. 28, 2023

(54) BACKLIGHT UNIT AND DISPLAY DEVICE INCLUDING THE SAME

(71) Applicant: Samsung Display Co., LTD., Yongin-si (KR)

(72) Inventors: Jae Sul An, Hwaseong-si (KR); Do Hun Kim, Suwon-si (KR); Tae Yong Ryu, Hwaseong-si (KR); Taek Sun Shin, Yongin-si (KR); Byung Seo Yoon, Hwaseong-si (KR); Ju Young Yoon, Seoul (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 315 days.

(21) Appl. No.: 16/814,437

(22) Filed: Mar. 10, 2020

(65) Prior Publication Data
US 2020/0371397 A1 Nov. 26, 2020

(30) Foreign Application Priority Data

May 20, 2019 (KR) .......................... 10-2019-0058624

(51) Int. Cl.
| | | |
|---|---|---|
| *G02F 1/13357* | (2006.01) | |
| *G02B 5/28* | (2006.01) | |
| *G02F 1/1335* | (2006.01) | |

(52) U.S. Cl.
CPC ......... *G02F 1/133605* (2013.01); *G02B 5/28* (2013.01); *G02F 1/133603* (2013.01); *G02F 1/133606* (2013.01); *G02F 1/133614* (2021.01)

(58) Field of Classification Search
CPC ......... G02F 1/133605; G02F 1/133603; G02F 1/133606; G02B 5/28

USPC ............................................................ 362/84
See application file for complete search history.

(56) References Cited

U.S. PATENT DOCUMENTS

| | | | |
|---|---|---|---|
| 6,517,213 B1* | 2/2003 | Fujita ...................... | G09F 13/04 |
| | | | 362/489 |
| 9,765,937 B2* | 9/2017 | Cha .................... | G02F 1/133617 |
| 11,256,137 B2* | 2/2022 | Lee .................... | G02F 1/133605 |
| 2009/0002830 A1* | 1/2009 | Okamoto .............. | G02B 5/285 |
| | | | 359/589 |
| 2020/0183234 A1* | 6/2020 | Kim .................. | G02F 1/133605 |
| 2020/0279979 A1* | 9/2020 | Lee ...................... | H01L 27/156 |
| 2021/0165277 A1* | 6/2021 | Park .................. | G02F 1/133606 |

(Continued)

FOREIGN PATENT DOCUMENTS

| | | |
|---|---|---|
| JP | 2007-4104 | 1/2007 |
| JP | 2007-88348 | 4/2007 |
| KR | 10-2008-0101501 | 11/2008 |

(Continued)

*Primary Examiner* — Bryon T Gyllstrom
(74) *Attorney, Agent, or Firm* — Kile Park Reed & Houtteman PLLC

(57) ABSTRACT

A backlight unit and a display device including the backlight unit are provided. A backlight unit includes a substrate, light sources disposed on one surface of the substrate, a first reflective film disposed on one surface of the substrate and including first openings, each of the first openings of the first reflective film exposing each of the light sources, and wavelength filter layers disposed above the first reflective film and disposed to correspond to the first openings, the wavelength filter layers are spaced apart from each other, and each of the wavelength filter layers covers at least one of the first openings.

17 Claims, 28 Drawing Sheets

(56) References Cited

U.S. PATENT DOCUMENTS

2021/0200030 A1\* 7/2021 Yoon ................. G02F 1/133603

FOREIGN PATENT DOCUMENTS

| KR | 10-2014-0123560 | 10/2014 |
| KR | 10-2017-0005344 | 1/2017 |

\* cited by examiner

FIG. 11
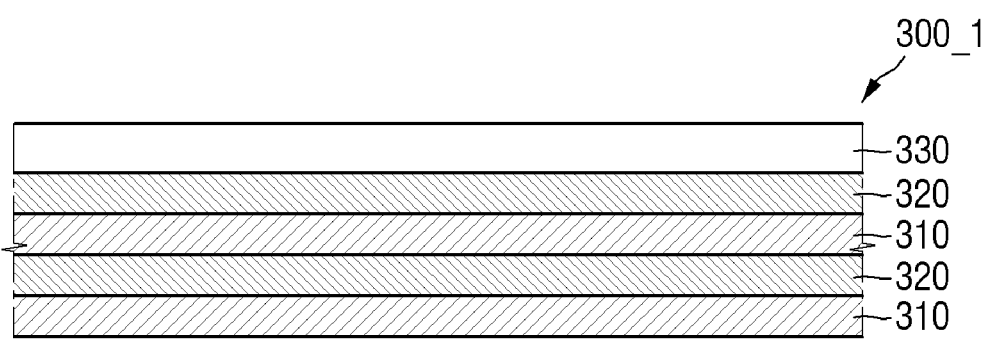
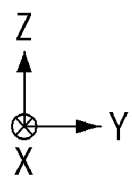

BACKLIGHT UNIT AND DISPLAY DEVICE INCLUDING THE SAME

CROSS-REFERENCE TO RELATED APPLICATIONS

This application claims priority to and benefits of Korean Patent Application No. 10-2019-0058624 under 35 U.S.C. § 119, filed in the Korean Intellectual Property Office on May 20, 2019, the entire contents of which are incorporated herein by reference.

BACKGROUND

1. Technical Field

The disclosure relates to a backlight unit and a display device including the same.

2. Description of the Related Art

A liquid crystal display device receives light from a backlight unit to display an image. The backlight unit may include light sources. Light emitted from the light sources is incident on a liquid crystal display panel through an optical film or the like.

Recently, studies have been conducted to include a wavelength filter layer in order to improve luminance uniformity, appearance and for reduced thickness of a liquid crystal display device. The wavelength filter layer may be formed by repeatedly stacking refractive layers having different refractive indexes. By changing the transmittance according to the wavelength region and/or the angle of light incident on the wavelength filter layer, it may be possible to diffuse the light.

In an edge type backlight unit, in which a light source may be located on the side of the display panel, a diffusion plate may be disposed above a light guide plate. On the other hand, in a direct type backlight unit, in which a light source may be disposed below the display panel, the diffusion plate may directly face the light source. The distance between the light source and the diffusion plate may be reduced as the thickness of the liquid crystal display device decreases. When the distance between the light source and the diffusion plate is reduced, a hot spot may occur above the light source, which may lower the luminance uniformity.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

Aspects of the disclosure provide a backlight unit and a display device including a backlight unit capable of reducing the material cost of a wavelength filter layer and/or increasing light diffusion to reduce an optical distance.

However, aspects of the disclosure are not restricted to those set forth herein. The above and other aspects of the disclosure will become more apparent to one of ordinary skill in the art to which the disclosure pertains by referencing the detailed description of the disclosure given below.

According to an embodiment of the disclosure, a backlight unit comprises a substrate, a plurality of light sources disposed on one surface of the substrate, a first reflective film disposed on one surface of the substrate and including first openings, each of the first openings of the reflective film exposing each of the light sources, and a plurality of wavelength filter layers disposed above the first reflective film and disposed to correspond to the first openings, wherein the plurality of wavelength filter layers are spaced apart from each other, and each of the wavelength filter layers covers at least one of the first openings.

The wavelength filter layers may have a different transmittance according to a wavelength of incident light and an incident angle with respect to a normal direction.

The light sources may emit light in a first wavelength band, and the wavelength filter layers may have a first transmittance for light in a first incident angle range and a second transmittance larger than the first transmittance for light in a second incident angle range larger than the first incident angle range.

The first incident angle range may be from about 0 degrees to about 40 degrees, and the second incident angle range may be from about 55 degrees to about 70 degrees.

The first transmittance may be in a range of about 0% to about 10%, and the second transmittance may be in a range of about 50% to about 70%.

The light sources may be configured such that a luminance in the normal direction may be larger than a luminance in an inclined direction.

The backlight unit may further comprise a wavelength conversion film disposed above the wavelength filter layers to convert light of the first wavelength band into light of a second wavelength band different from the first wavelength band.

Light emitted to the light sources may have an optical path within an orientation angle range of the light sources, and in the optical path, a reference path line, which may have a maximum angle from a reference line vertically passing through a center of at least one of the light sources, passes through at least one of the wavelength filter layers.

The wavelength filter layers may include a first refractive layer and a second refractive layer which are alternately stacked, and a first refractive index of the first refractive layer is different from a second refractive index of the second refractive layer.

Widths of the wavelength filter layers may be larger than widths of the first openings to cover the first openings.

The wavelength filter layers may completely cover the first openings, and may overlap the first reflective film around the first openings.

The backlight unit may further comprise an adhesive layer interposed between the wavelength filter layers and the first reflective film.

The first openings surround each of the light sources, and a thickness of the first reflective film may be larger than a thickness of the light sources.

A separation distance between the wavelength filter layers adjacent to each other may be larger than a width of the each of the wavelength filter layers.

The backlight unit may further comprise a second reflective film disposed above the wavelength filter layers and including second openings overlapping the first openings.

The backlight unit may further comprise a diffusion plate disposed above the wavelength filter layers.

The backlight unit may further comprise a plurality of reflective patterns disposed on a lower surface of the diffusion plate, wherein an interval between the reflective patterns at a first distance from the light sources may be smaller than an interval between the reflective patterns at a second distance, which may be greater than the first distance, from the light sources.

According to an embodiment of the disclosure, a display device comprises a backlight unit including a substrate, LED chips disposed on one surface of the substrate to emit light, a reflective film disposed on one surface of the substrate and including openings, each of the openings exposing each of the LED chips, a plurality of wavelength filter layers disposed above the reflective film and corresponding to the openings, and a wavelength conversion film disposed above the wavelength filter layers and converting the light from the LED chips into light of different wavelengths, and a display panel disposed above the backlight unit, wherein the plurality of wavelength filter layers are spaced apart from each other, and each of the wavelength filter layers covers at least one of the openings.

The wavelength filter layer may transmit the blue light, which is incident at an incident angle of about 0 degrees to about 40 degrees, in a range of about 0% to about 10% and may transmit the blue light, which is incident at an angle of about 55 degrees to about 70 degrees, in a range of about 50% to about 70%.

A width of the wavelength filter layer may be larger than a width of the opening, and the wavelength filter layer may completely cover the opening and may overlap the reflective film around the opening.

In the backlight unit according to embodiments of the disclosure, by arranging a wavelength filter layer between a light source and a diffusion plate even though an optical distance may be reduced, it may be possible to reduce light output in an upward direction of the light source and increase the light diffusion, thereby improving the luminance uniformity. By selectively patterning and arranging the wavelength filter layer in partial regions of a reflective film, it may be possible to reduce the material cost.

In the backlight unit according to embodiments of the disclosure, by configuring a reflective film as multiple layers, it may be possible to prevent the light emitted from the light source from being visually recognized from the outside.

The above described effects of the disclosure are not limited to the above-described effects and other effects which are not described herein will become apparent to those skilled in the art from the following description.

BRIEF DESCRIPTION OF THE DRAWINGS

The above and other aspects and features of the disclosure will become more apparent by describing in detail embodiments thereof with reference to the attached drawings, in which:

FIG. 11 is a schematic cross-sectional view of a wavelength filter layer according to an embodiment;

DETAILED DESCRIPTION OF THE EMBODIMENTS

Figure 1:
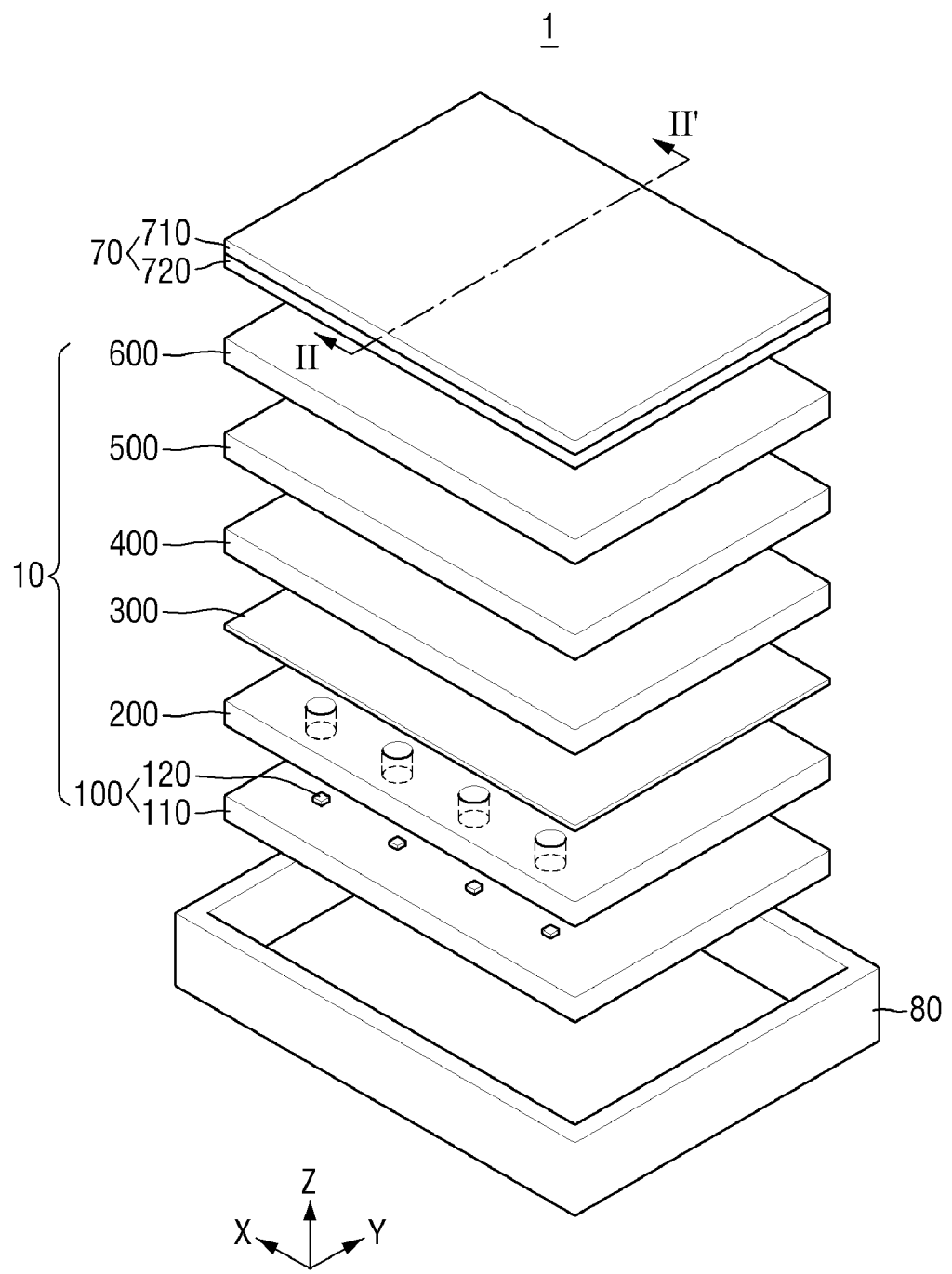
FIG. 1 is an exploded perspective view of a display device according to an embodiment.

The invention will now be described hereinafter with reference to the accompanying drawings. Although the invention may be modified in various manners and have additional embodiments, embodiments are illustrated in the accompanying drawings and will be mainly described in the specification. However, the scope of the invention is not limited to the embodiments in the accompanying drawings and the specification and should be construed as including all the changes, equivalents and substitutions included in the spirit and scope of the invention.

Some of the parts which are not associated with the description may not be provided in order to describe embodiments of the invention and like reference numerals refer to like elements throughout the specification.

When a layer, film, region, substrate, or area, is referred to as being "on" another layer, film, region, substrate, or area, it may be directly on the other film, region, substrate, or area, or intervening films, regions, substrates, or areas, may be present therebetween. Conversely, when a layer, film, region, substrate, or area, is referred to as being "directly on" another layer, film, region, substrate, or area, intervening layers, films, regions, substrates, or areas, may be absent therebetween. Further when a layer, film, region, substrate, or area, is referred to as being "below" another layer, film, region, substrate, or area, it may be directly below the other layer, film, region, substrate, or area, or intervening layers, films, regions, substrates, or areas, may be present therebetween. Conversely, when a layer, film, region, substrate, or area, is referred to as being "directly below" another layer, film, region, substrate, or area, intervening layers, films, regions, substrates, or areas, may be absent therebetween. Further, "over" or "on" may include positioning on or below an object and does not necessarily imply a direction based upon gravity.

The spatially relative terms "below", "beneath", "lower", "above", "upper", or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations.

Throughout the specification, when an element is referred to as being "connected" to another element, the element may be "directly connected" to another element, or "electrically connected" to another element with one or more intervening elements interposed therebetween. It will be further understood that when the terms "comprises," "comprising," "includes" and/or "including" are used in this specification, they or it may specify the presence of stated features, integers, steps, operations, elements and/or components, but do not preclude the presence or addition of other features, integers, steps, operations, elements, components, and/or any combination thereof.

It will be understood that, although the terms "first," "second," "third," or the like may be used herein to describe various elements, these elements should not be limited by these terms. These terms are used to distinguish one element from another element or for the convenience of description and explanation thereof. For example, when "a first element" is discussed in the description, it may be termed "a second element" or "a third element," and "a second element" and "a third element" may be termed in a similar manner without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within 30%, 20%, 5% of the stated value.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the specification.

Hereinafter, embodiments of the disclosure will be described with reference to the drawings.

Figure 2:
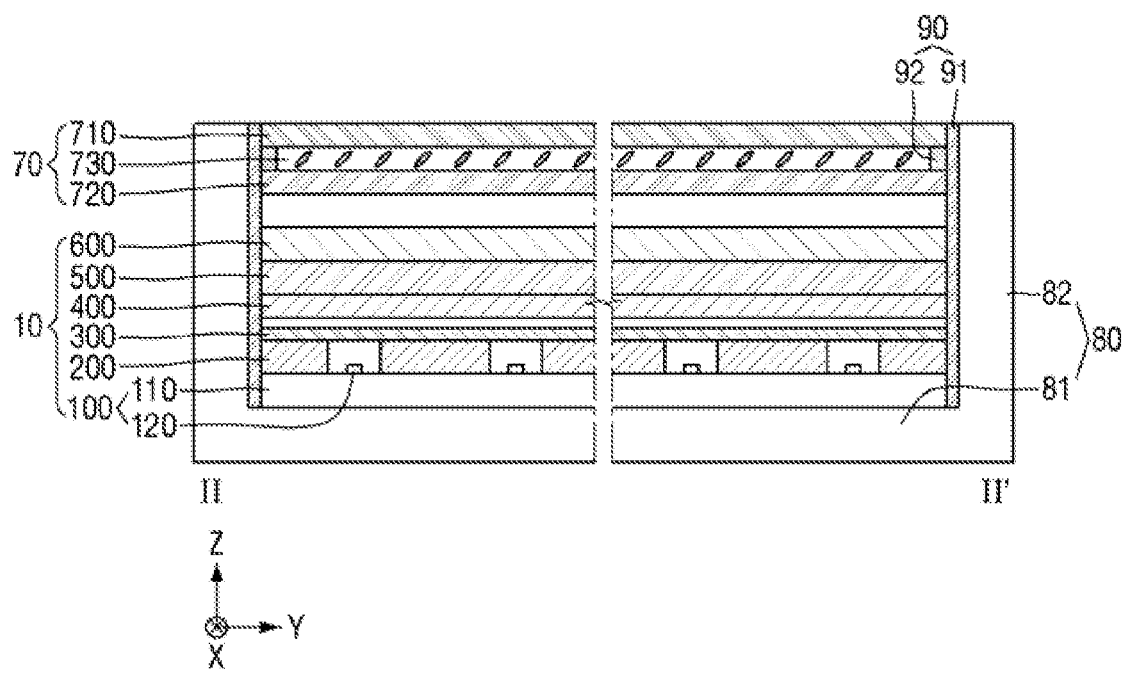
FIG. 2 is a schematic cross-sectional view taken along line II-II' of FIG. 1.

FIG. 1 is an exploded perspective view of a display device according to an embodiment. FIG. 2 is a schematic cross-sectional view taken along line II-II' of FIG. 1.

Referring to FIGS. 1 and 2, a display device 1 is a device for displaying an image or a video. Examples of the display device 1 may include various electronic devices such as a television, an external billboard, a monitor, a personal computer, a laptop computer, a tablet PC, a smartphone, a vehicle navigation unit, a camera, a center information display (CID) provided in a vehicle, a wristwatch type electronic device, a personal digital assistant (PDA), a portable multimedia player (PMP), a game console, and the like. These are merely suggested as examples, but the display device 1 may also be applied to other electronic devices without departing from the spirit and scope of the disclosure.

A first direction X, a second direction Y, and a third direction Z are defined as shown in the drawings. The first direction X and the second direction Y may be directions perpendicular to each other in one plane. The third direction Z may be a direction perpendicular to a plane on which the first direction X and the second direction Y may be located. The third direction Z may be perpendicular to each of the first direction X and the second direction Y. In the embodiments, the third direction Z may indicate a thickness direction of the display device 1.

Unless otherwise specified in the embodiments, the terms "above" and "upward" as used herein refer to a thickness direction (upper side in the figure) of the display device 1 as one side in the third direction Z, and the term "upper surface" similarly refers to a surface toward one side in the third direction Z. The terms "below" and "downward" as used herein refer to a direction (lower side in the figure) opposite to the thickness direction of the display device 1 as the other side in the third direction Z, and the term "lower surface" refers to a surface toward the other side in the third direction Z.

The display device 1 may have a rectangular shape including long and short sides such that the side in the first direction X may be longer than the side in the second direction Y in plan view. A corner portion where the long side and the short side of the display device 1 meet may have a right angle in plan view. However, the disclosure is not limited thereto, and the corner portion may be rounded to have a curved shape or other suitable shape. The planar shape of the display device 1 is not limited to the exemplified ones, but may have various shapes such as a square, a circle, an ellipse or other polygons. A display surface of the display device 1 may be disposed on one side in the third direction Z which is the thickness direction.

The display device 1 may include a display panel 70, a backlight unit 10 disposed below the display panel 70 to provide light to the display panel 70, and a housing 80 configured to accommodate the display panel 70 and the backlight unit 10.

The display panel 70 may display a screen by receiving the light emitted from the backlight unit 10. The display panel 70 may be a light receiving display panel, for example, a liquid crystal display panel, an electrowetting display panel, an electrophoretic display panel, or the like. Hereinafter, a liquid crystal display panel 70 (LCD) will be described as an example. However, it is obvious that the following description can be similarly applied even when the display panel 70 is of a different kind.

The display panel 70 may include an upper substrate 710, a lower substrate 720 facing the upper substrate 710, and a liquid crystal layer 730 disposed therebetween as illustrated in FIG. 2. The display panel 70 may include pixels. The pixels of the display panel 70 may be arranged in a matrix. The display panel 70 may include a switching element and a pixel electrode provided for each pixel, and a common electrode facing the pixel electrode. The switching element and the pixel electrode may be disposed on the lower substrate 720, and the common electrode may be disposed on the upper substrate 710. However, the disclosure is not limited thereto, and the common electrode may also be disposed on the lower substrate 720. A sealing member 92 may be disposed on the edges of the upper substrate 710 and the lower substrate 720 to confine the liquid crystal molecules of the liquid crystal layer 730.

The backlight unit 10 may be disposed below the display panel 70. The backlight unit 10 may include a light source member 100, a reflective member 200, a wavelength filter layer 300, a diffusion plate 400, a wavelength conversion film 500 and an optical sheet 600.

The light source member 100 may include a first substrate 110 and multiple light sources 120 disposed on the first substrate 110.

The light source 120 emits light to be provided to the display panel 70. The light source 120 may be a point light source. The light source 120 may be provided in a chip form. For example, the light source 120 may be a light emitting diode chip (LED chip), but is not limited thereto. The light emission direction of each light source 120 may be substantially an upward direction in the figures.

The light source 120 may emit light of a specific wavelength band. For example, the light source 120 may emit blue light having a wavelength band of 420 nm to 470 nm. In some embodiments, the light source 120 may emit light having two or more peak wavelengths. For example, the light source 120 may emit near-ultraviolet light and blue light.

The light emitted from the light source 120 may be incident on the wavelength filter layer 300 disposed thereabove.

The reflective member 200 may be disposed to surround at least one light source 120 on the first substrate 110. The reflective member 200 may reflect at least a portion of the light, which is emitted from the light source 120, enters the wavelength filter layer 300 but is reflected without being transmitted, and allow it to re-enter the wavelength filter layer 300.

The wavelength filter layer 300 may be overlappingly disposed above the light source member 100. The wavelength filter layer 300 serves to transmit a portion of the light, which is emitted from the light source 120 and enters the wavelength filter layer 300, and reflect the other portion of the light. The light reflectivity by the wavelength filter layer 300 may vary depending on the wavelength of the light or the incident angle.

A detailed description of the light source member 100, the reflective member 200 and the wavelength filter layer 300 will be given later.

The diffusion plate 400 may be disposed above the wavelength filter layer 300. The diffusion plate 400 may be spaced apart from the wavelength filter layer 300 in the third direction Z. Since the diffusion plate 400 is spaced apart from the wavelength filter layer 300 by a predetermined distance, it may be possible to disperse the light emitted from the light sources 120 to prevent the light from being concentrated. The diffusion plate 400 serves to diffuse the light emitted from the wavelength filter layer 300 toward the display panel 70 and to provide the light emitted from the light sources 120 to the display panel 70 with a more uniform luminance. However, the disclosure is not limited thereto, and the diffusion plate 400 may be disposed on the wavelength filter layer 300.

The diffusion plate 400 may include a light transmitting material. The diffusion plate 400 may include a material such as polymethyl methacrylate (PMMA), polystyrene (PS), polypropylene (PP), polyethylene terephthalate (PET), polycarbonate (PC), and other suitable light transmitting materials.

The wavelength conversion film 500 may be disposed on the diffusion plate 400. The wavelength conversion film 500 serves to convert the wavelength of at least a portion of light emitted from the diffusion plate 400 toward the display panel 70.

The wavelength conversion film 500 may include a binder layer and wavelength conversion particles dispersed in the binder layer. The wavelength conversion film 500 may include scattering particles dispersed in the binder layer along with the wavelength conversion particles.

The binder layer, which is a medium in which the wavelength conversion particles may be dispersed, may be formed of various resin compositions. However, the disclosure is not limited thereto, and a medium capable of dispersing and arranging the wavelength conversion particles and/or scattering particles may be referred to as a binder layer regardless of its name, other additional functions, constituent materials, and the like.

The wavelength conversion particle may be a particle that converts a wavelength of incident light, and may be, for example, a quantum dot (QD), a fluorescent material or a phosphorescent material. In the following description, it may be assumed that wavelength conversion particles are quantum dots, but the disclosure is not limited thereto.

The quantum dot is a material having a crystal structure of a few nanometers in size, consisting of hundreds to thousands of atoms, and may exhibit a quantum confinement effect in which an energy band gap increases due to its small size. When light with a wavelength having higher energy than the band gap is incident on the quantum dot, the quantum dot may enter into an excited state by absorbing the light, and fall to a ground state while emitting light of a specific wavelength. The emitted light of the specific wavelength has a value corresponding to the band gap. It is possible to adjust the light emission characteristics of the quantum dot due to the quantum confinement effect by adjusting the size and composition of the quantum dot.

For example, the quantum dot may include at least one of Group II-VI compounds, Group II-V compounds, Group III-VI compounds, Group III-V compounds, Group IV-VI compounds, Group I-III-VI compounds, Group II-IV-VI compounds and Group II-IV-V compounds.

The quantum dot may include a core and a shell that overcoats the core. The core may be at least one of, for example, CdS, CdSe, CdTe, ZnS, ZnSe, ZnTe, GaN, GaP, GaAs, GaSb, AlN, AlP, AlAs, AlSb, InP, InAs, InSb, SiC, Ca, Se, In, P, Fe, Pt, Ni, Co, Al, Ag, Au, Cu, FePt, $Fe_2O_3$, $Fe_3O_4$, Si and Ge, but is not limited thereto. The shell may include at least one of, for example, ZnS, ZnSe, ZnTe, CdS, CdSe, CdTe, HgS, HgSe, HgTe, AlN, AlP, AlAs, AlSb, GaN, GaP, GaAs, GaSb, GaSe, InN, InP, InAs, InSb, TlN, TlP, TlAs, TlSb, PbS, PbSe and PbTe, but is not limited thereto.

The wavelength conversion particles may include wavelength conversion particles capable of converting incident light into light with different wavelengths. For example, the wavelength conversion particles may include a first wavelength conversion particle which converts incident light of a specific wavelength into light of a first wavelength and emits the converted light, and a second wavelength conversion particle which converts incident light of a specific wavelength into light of a second wavelength and emits the converted light. In an embodiment, the light emitted from the light sources 120 and incident on the wavelength conversion particles may be light of a blue wavelength, the first wavelength may be a green wavelength, and the second wavelength may be a red wavelength. For example, the blue wavelength may be a wavelength having a peak at 420 to 470 nm, the green wavelength may be a wavelength having a peak at 520 nm to 570 nm, and the red wavelength may be a wavelength having a peak at 620 nm to 670 nm. However, the blue, green, and red wavelengths are not limited to the above examples, and should be understood to include all wavelength ranges that can be perceived as blue, green, and red lights to one of ordinary skill in the art.

At least one optical sheet 600 may be disposed on the wavelength conversion film 500. The optical sheet 600 may perform optical functions such as light collection, refraction, diffusion, reflection, polarization and phase delay on incident light. Examples of the optical sheet 600 may include a prism sheet, a microlens sheet, a lenticular sheet, a diffusion sheet, a polarizing sheet, a reflective polarizing sheet, a retardation sheet, a protective sheet and the like. In some embodiments, the optical sheet 600 may have layers having multiple optical functions, which may be integrally combined.

The housing 80 accommodates the backlight unit 10 and the display panel 70. The housing 80 may include a bottom chassis or bracket. Although not shown in the drawings, the housing 80 may include a top chassis.

The housing 80 may include a bottom surface 81 and a sidewall 82. The sidewall 82 of the housing 80 may be connected to the bottom surface 81 and may be bent in a substantially vertical direction therefrom. The light source member 100 of the backlight unit 10 may be disposed on the bottom surface 81 of the housing 80. The reflective member 200, the wavelength filter layer 300, the diffusion plate 400, the wavelength conversion film 500, the optical sheet 600 and the display panel 70 of the backlight unit 10 may be fixed to the sidewall 82 of the housing through an adhesive tape 91. However, the disclosure is not limited thereto, and the above-mentioned members may be mounted on another seating structure of the housing 80, or may be mounted on or attached to a mold frame provided inside the housing 80.

Hereinafter, the light source member 100, the reflective member 200 and the wavelength filter layer 300 will be described in detail.

Figure 3:
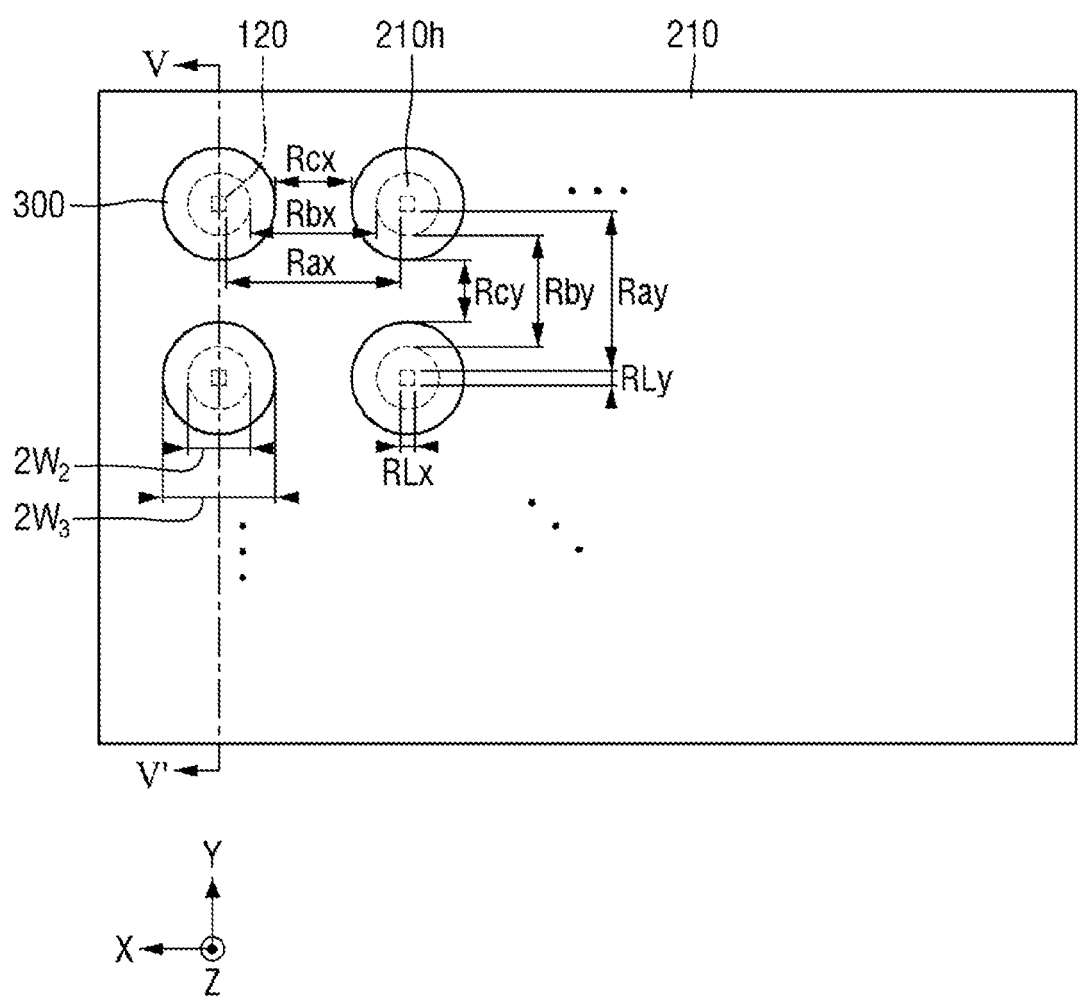
FIG. 3 is a layout diagram showing relative positional relationships among light sources of a light source member, a reflective member and a wavelength filter layer.
Figure 4:
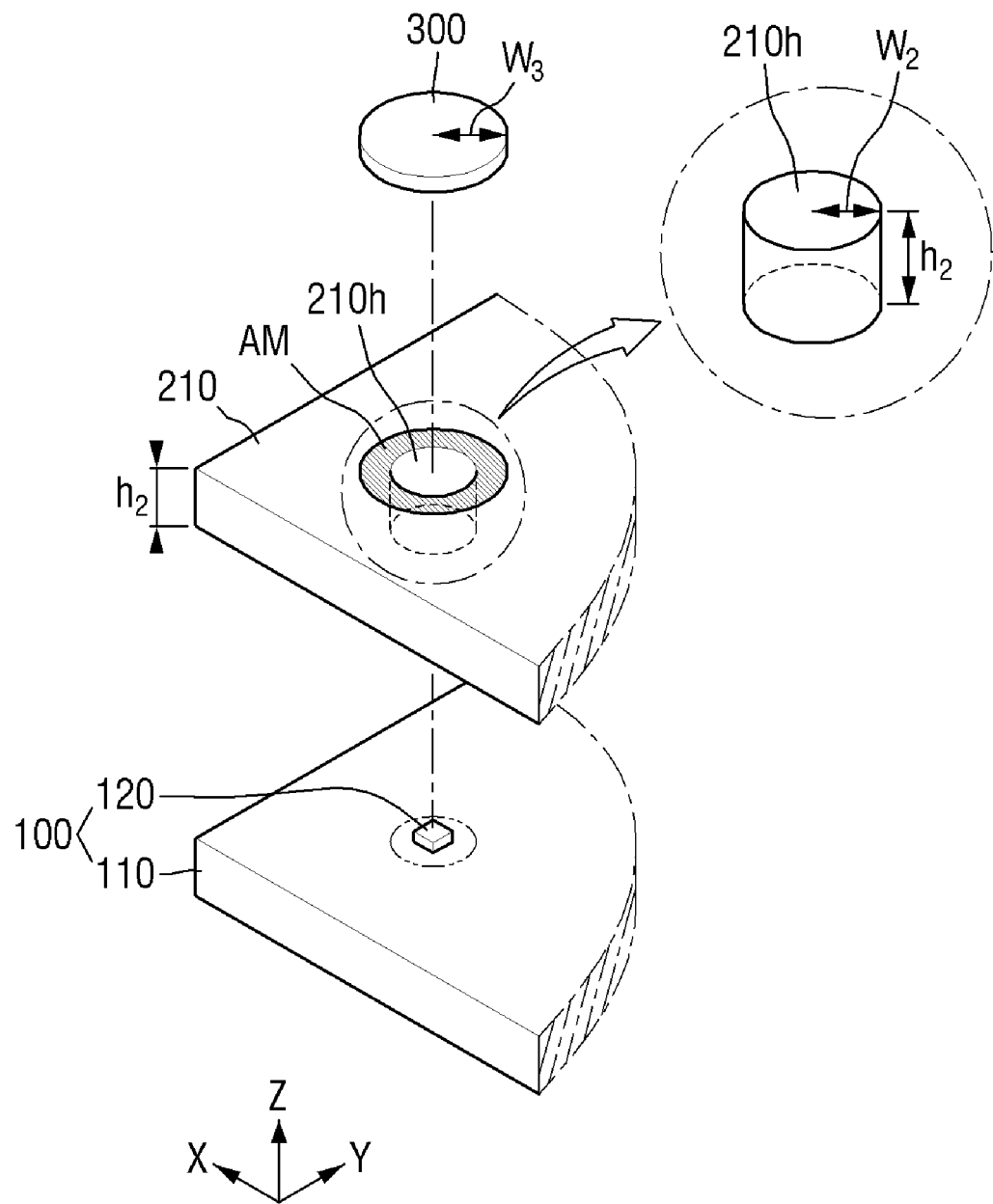
FIG. 4 is an exploded perspective view showing a portion of a backlight unit corresponding to one light source of FIG. 3.

FIG. 3 is a layout diagram showing a relative positional relationship among the light sources of the light source member, the reflective member and the wavelength filter layer. FIG. 4 is an exploded perspective view showing a portion of a backlight unit corresponding to one light source of FIG. 3.

Referring to FIG. 3, the light sources 120 may be arranged in a matrix. The light sources 120 may be spaced apart from each other along the first direction X and the second direction Y in plan view and may be disposed at predetermined intervals. Because the light sources 120 are spaced apart from each other means that they are spaced from each other with respect to a light emitting portion of each light source 120. Accordingly, not only when light source packages constituting the respective light sources 120 are spaced apart from each other but also when the light source packages of the respective light sources 120 are adjacent or connected to each other, if the light emitting portions of the light sources 120 are spaced apart, the light sources 120 are construed to be spaced apart. Although it is illustrated in the drawing that the arrangement directions of the light sources 120 are the same as the extending directions of the long and short sides of the display device, the disclosure is not limited thereto. The arrangement direction of the light sources 120 and the extending direction of the long/short side of the display device 1 may be inclined at a predetermined inclination. Although it is illustrated in the embodiment of FIG. 3 that each row and each column of an array of the light sources 120 extend in a linear manner, the light sources 120 may be arranged such that neighboring rows and/or columns cross each other.

Unless otherwise mentioned, in FIG. 3, a distance Rax between the light sources 120 in the first direction X is defined as the closest distance between the two sides, which face each other in the first direction X, of the two light sources 120 adjacent to each other in the first direction X, and a distance Ray between the light sources 120 in the second direction Y is defined as the closest distance between the two sides, which face each other in the second direction Y, of the two light sources 120 adjacent to each other in the second direction Y.

Each light source 120 may have a square shape, in plan view, in which a length RLx of the side in the first direction X is the same as a length RLy of the side in the second direction Y. In the following embodiments, it is assumed that the planar shape of each light source 120 has a square shape, but the planar shape of each light source 120 is not limited thereto, and may have other shapes such as a rectangle, a circle, and the like.

In the light sources 120, the distance Rax in the first direction X may be the same as or similar to the distance Ray in the second direction Y as shown in FIG. 3. However, the disclosure is not limited thereto, and the distance Rax between the two light sources 120 adjacent to each other in the first direction X and the distance Ray between the two light sources 120 adjacent to each other in the second direction Y may be different from each other.

In the light sources 120, each of the distance Rax in the first direction X and the distance Ray in the second direction Y may be greater than or equal to the length RLx of the side in the first direction X and the length RLy of the side in the second direction Y in plan view. If the size (RLx, RLy) of the light sources 120 is smaller than the distance (Rax, Ray) between the two light sources 120 adjacent to each other in plan view, bright and dark portions may occur. The luminance uniformity can be improved through the relative arrangement of the reflective member 200, the wavelength filter layer 300 and the diffusion plate 400, which will be described later.

Figure 5:
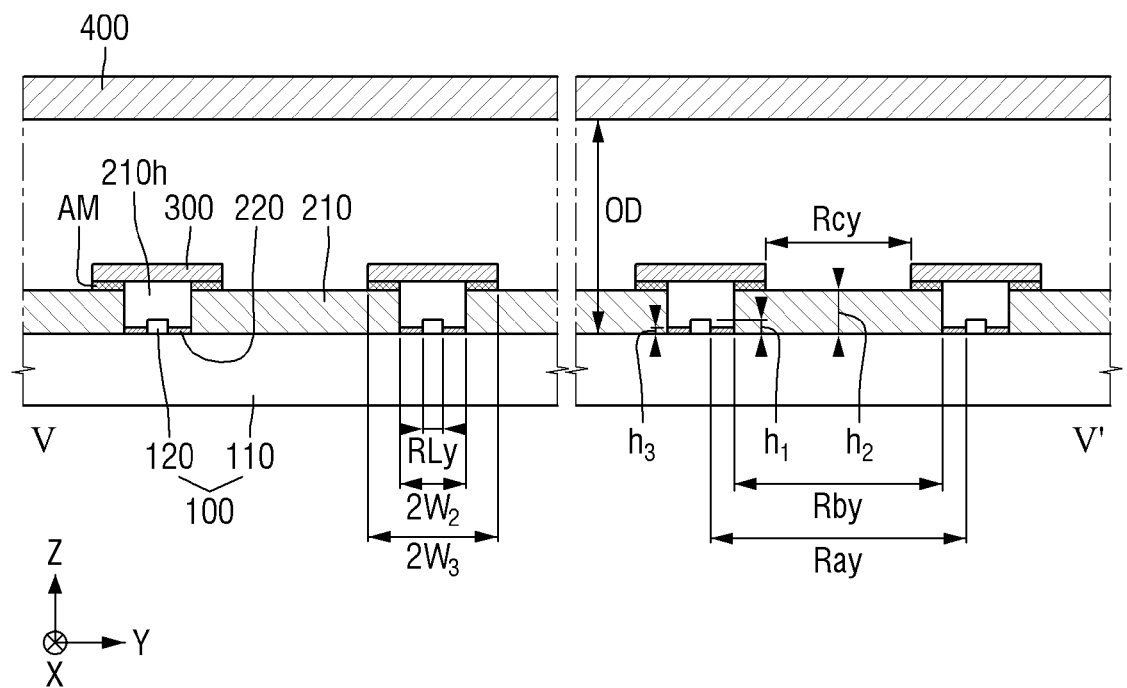
FIG. 5 is a schematic cross-sectional view taken along line V-V' of FIG. 3.

The reflective member 200 may include a reflective film 210 and a reflective coating layer 220 (see FIG. 5). The reflective coating layer may be discrete or discontinuous reflective coating layers as illustrated in FIG. 5. The reflective member 200 may be disposed on one surface of the first substrate 110 on which the light sources 120 are not disposed.

The reflective film 210 may have a planar shape substantially similar to that of the display panel 70. For example, when the display panel 70 has a rectangular planar shape, the reflective film 210 may also have a rectangular planar shape similar thereto. The reflective film 210 and the display panel 70 may have substantially the same size in plan view, but the disclosure is not limited thereto.

The reflective film 210 may include at least one opening 210h. The opening 210h may be formed to completely pass through the reflective film 210 in the third direction Z (or the thickness direction). The opening 210h may be formed in a cylindrical shape having a predetermined radius $W_2$ and a predetermined height $h_2$ as illustrated in FIG. 4. Herein, in reference to the opening 210h, radius and width may be used interchangeably.

The height $h_2$ of the opening 210h may be equal to the height of the reflective film 210.

Openings 210h may have a circular shape having the same or similar area in plan view. However, the disclosure is not limited thereto, and the planar shape of the openings 210h may have other shapes such as a square, an ellipse and a rectangle, or the sizes of the respective openings 210h in plan view may be different from each other.

The openings 210h may be spaced apart at predetermined intervals. The openings 210h may be spaced apart from each other at predetermined intervals along the first direction X and the second direction Y. The reflective film 210 may be arranged such that each opening 210h exposes at least one light source 120 in the third direction Z (or the thickness direction). In one embodiment, each opening 210h may be formed to correspond to one light source 120 on a one-to-one basis.

Each of the openings 210h formed in the reflective film 210 may be disposed to surround at least one light source 120. The opening 210h may completely expose the light source 120 in the third direction Z. In one embodiment, the area of the opening 210h may be larger than the area of the corresponding light source 120 to completely expose the light source 120 in a direction toward the display surface.

An interval Rbx between the two openings 210h adjacent to each other in the first direction X and an interval Rby between the two openings 210h adjacent to each other in the second direction Y may be equal to each other. However, the disclosure is not limited thereto, and the interval Rbx between the two openings 210h adjacent to each other in the first direction X and the interval Rby between the two openings 210h adjacent to each other in the second direction Y may be different from each other according to the shape of each of the openings 210h.

In an embodiment, the distance Rax between the two light sources 120 in the first direction X and the distance Ray between the two light sources 120 in the second direction Y may be larger than the interval Rbx between the two openings 210h in the first direction X and the interval Rby between the two openings 210h in the second direction Y, respectively. The larger the diameter of the opening 200h, the larger the difference between the distance (Rax, Ray) between the light sources 120 and the interval (Rbx, Rby) between the openings 210h.

The wavelength filter layers 300 may be disposed on one surface of the reflective film 210. In an embodiment, the wavelength filter layers 300 may be patterned. The wavelength filter layers 300 may be separated from each other. Each of the patterned wavelength filter layers 300 may have a cylindrical shape. Each wavelength filter layer 300 may have a planar shape similar to that of the opening 210h. For example, when the planar shape of the opening 210h is a circular shape, the wavelength filter layer 300 may also have a circular shape similar thereto. However, the disclosure is not limited thereto, and the planar shapes of the openings 210h and the wavelength filter layers 300 may be different from each other.

The wavelength filter layers 300 may be disposed to overlap at least one light source 120 and/or the opening 210h in the third direction Z. The wavelength filter layers 300 may completely cover the at least one light source 120 and/or the opening 210h. Each wavelength filter layer 300 may be overlappingly disposed to correspond one-to-one to one light source 120 and/or one opening 210h.

When the planar shape of the opening 210h and the wavelength filter layer 300 is circular, a width $2W_3$ of the wavelength filter layer 300 may be larger than a width $2W_2$ of the opening 210h in plan view. That is, the area of the wavelength filter layer 300 may be larger than the area of the corresponding light source 120 and/or the area of the corresponding opening 210h to completely cover the light source 120 and/or the opening 210h in the direction toward the display surface. Accordingly, a partial area (for example, an edge area) of the wavelength filter layer 300 may be disposed to overlap the upper surface of the reflective film 210.

The wavelength filter layers 300 may be spaced apart at predetermined intervals. The wavelength filter layers 300 may be spaced apart from each other at predetermined intervals along the first direction X and the second direction Y. An interval Rcx between the two wavelength filter layers 300 adjacent to each other in the first direction X and an interval Rcy between the two wavelength filter layers 300 adjacent to each other in the second direction Y may be equal to each other. However, the disclosure is not limited thereto, and the interval Rcx between the two wavelength filter layers 300 adjacent to each other in the first direction X and the interval Rcy between the two wavelength filter layers 300 adjacent to each other in the second direction Y may be different from each other according to the shape of each of the wavelength filter layers 300.

An adhesive layer AM may be disposed between the reflective film 210 and the wavelength filter layer 300. The adhesive layer AM serves to fix the wavelength filter layer 300 on the reflective film 210. The adhesive layer AM may be disposed on the reflective film 210 in a region where the reflective film 210 and the wavelength filter layer 300 overlap each other. That is, the adhesive layer AM may be disposed on one surface of the reflective film 210 in plan view in the overlap region with the individual wavelength filter layer 300 except for the region of the individual opening 210h. For example, the adhesive layer AM may be disposed on the edge portion of the individual wavelength filter layer 300 in plan view.

Figure 6:
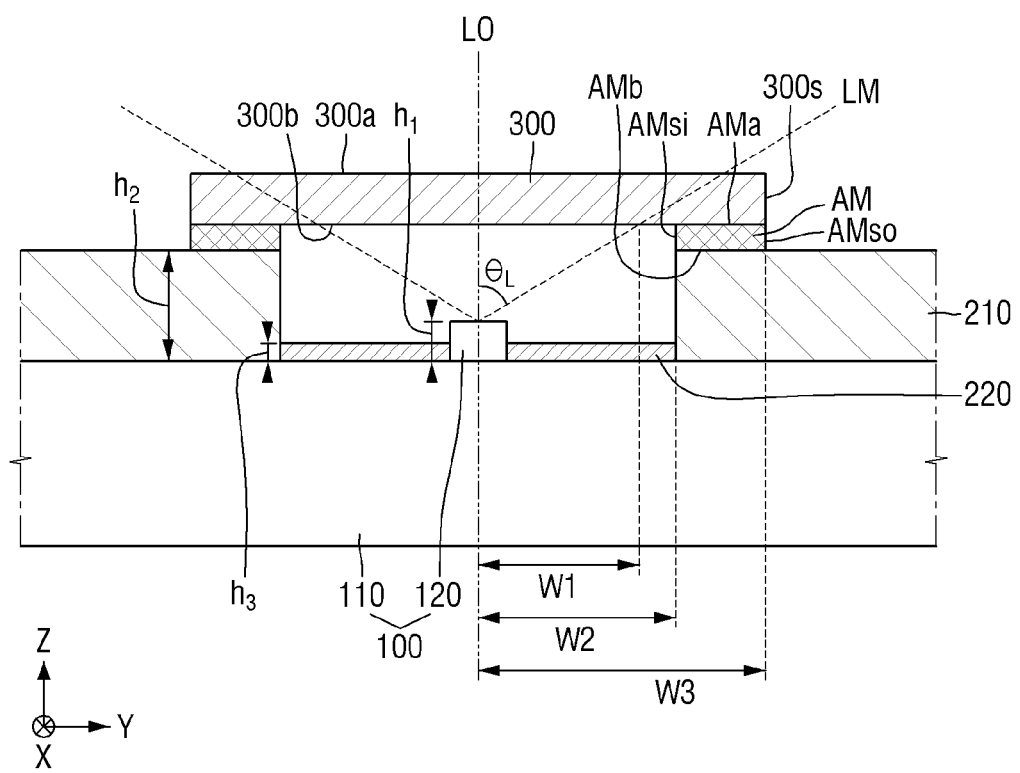
FIG. 6 is an enlarged view of the light source member, the reflective member and the wavelength filter layer corresponding to one light source in the schematic cross-sectional view of FIG. 5.

FIG. 5 is a schematic cross-sectional view taken along line V-V' of FIG. 3. In FIG. 5, the diffusion plate 400 disposed above the wavelength filter layer 300 is also shown for convenience of description. FIG. 6 is an enlarged view of the light source member 100, the reflective member 200, and the wavelength filter layer 300 corresponding to one light source in the schematic cross-sectional view of FIG. 5.

Referring to FIGS. 5 and 6, the light source member 100 may include the first substrate 110, and the light sources 120 disposed on the first substrate 110.

The first substrate 110 may be an insulating substrate or a circuit board. When the first substrate 110 is an insulating substrate, the first substrate 110 may include a transparent material such as glass or quartz, or may include a polymer material such as polyimide. When the first substrate 110 is an insulating substrate, the light source member 100 may include a circuit element layer (not shown) for driving the light sources 120. The circuit element layer may be formed on one surface of the insulating substrate. Alternatively, the circuit element layer may be formed of a printed circuit board or the like and attached or fixed to one surface of the insulating substrate. When the first substrate 110 is a circuit board, the first substrate 110 may be formed of a printed circuit board (PCB). When the first substrate 110 is a printed circuit board, the light sources 120 mounted on the first substrate 110 may be electrically connected to each other.

The first substrate 110 may have a planar shape substantially similar to that of the display panel 70. For example, when the display panel 70 has a rectangular planar shape, the first substrate 110 may also have a rectangular planar shape similar thereto. The first substrate 110 and the display panel 70 may have substantially the same size in plan view, but the disclosure is not limited thereto.

Each of the light sources 120 may have a rectangular parallelepiped shape. Each of the length RLx of the side of the light source 120 in the first direction X and the length RLy of the side of the light source 120 in the second direction Y in plan view may be about 250 μm to about 500 μm. The height of each light source 120 may be less than the lengths RLx and RLy of the light source 120 in plan view and may be, for example, about 130 μm to about 200 μm. In an exemplary embodiment, the planar shape of each light source 120 is a square in which the length RLx of the side in the first direction X is about 500 μm and the same as the length RLy of the side in the second direction Y, and the height of the light source 120 (i.e., a distance $h_1$ in the third direction Z from the upper surface of the first substrate 110 to the upper surface of the light source 120) may be about 150 μm.

As described above, the distance Ray between the light sources 120 in the second direction Y may be greater than the length RLy of the side of each light source 120 in the second direction Y. In an embodiment, when the length RLy of the side of each light source 120 in the second direction Y is about 500 μm, the distance Ray between the light sources 120 in the second direction Y may be 50 mm. However, the disclosure is not limited thereto, when the length RLy of the side of each light source 120 in the second direction Y is about 500 μm, the distance Ray between the light sources 120 in the second direction Y may be less than or equal to 50 mm.

The reflective film 210 may reflect at least a portion of the light, which is emitted from the light source 120 but leaks in a lateral direction and/or the light, which is emitted from the light source 120, enters the wavelength filter layer 300 but is reflected without being transmitted, and allow it to re-enter the wavelength filter layer 300.

The reflective film 210 may include a material having high reflectivity. The reflective film 210 may include a metal material such as silver (Ag), copper (Cu), aluminum (Al), nickel (Ni), lanthanum (La), an alloy thereof, Indium Tin Oxide (ITO), Indium Zinc Oxide (IZO), Indium Tin-Zinc Oxide (ITZO) and the like, but is not limited thereto.

The reflective film 210 may be disposed to surround the light source 120 in plan view. In one embodiment, the reflective film 210 may include openings 210h at positions where a plurality of light sources 120 arranged in a matrix are disposed, and may be spaced apart from the light sources 120 in a horizontal direction on the first substrate 110. The reflective film 210 may not overlap the light sources 120 on the first substrate 110 in the thickness direction.

The reflective film 210 includes an upper surface and a lower surface. The upper surface and the lower surface of the reflective film 210 face each other. Each of the upper surface and the lower surface of the reflective film 210 may be located on one plane, and the plane on which the upper surface is located and the plane on which the lower surface is located may be substantially parallel to each other. Accordingly, the reflective film 210 may have a uniform thickness as a whole. The lower surface of the reflective film 210 is placed on one surface of the first substrate 110.

The reflective film 210 may include sidewalls exposed through the respective openings 201h of the reflective film 210. The sidewall of the reflective film 210 may face the light source 120. In one embodiment, the plane on which the sidewall of the reflective film 210 is located may have an angle of about 90 degrees with respect to the plane on which the upper surface and/or the lower surface of the reflective film 210 is located. The sidewall of the reflective film 210 may have an angle of about 90 degrees with respect to the plane on which the upper surface of the first substrate 110 is located.

The thickness $h_2$ (i.e., a distance from one surface of the first substrate 110 to the upper surface of the reflective film 210 in the third direction Z) of the reflective film 210 may be greater than or equal to the height of the light source 120. When the thickness $h_2$ of the reflective film 210 is larger than the height $h_1$ of the light source 120, it may be effective to prevent light emitted from the light source 120 from leaking into a space between the wavelength filter layers 300. In an embodiment, the height $h_1$ of the light source 120 may be 150 μm, and the thickness $h_2$ of the reflective film 210 may be 200 μm to 300 μm, but the disclosure is not limited thereto.

The reflective coating layer 220 is disposed on one surface of the first substrate 110. In an embodiment, the reflective coating layer 220 may be disposed in a separation space between the light source 120 and the reflective film 210 on one surface of the first substrate 110. The reflective coating layer 220 may be disposed to surround the light source 120 in plan view. The reflective coating layer 220 may at least partially or entirely cover one surface of the first substrate 110 exposed by the light source 120 and the reflective film 210.

The reflective coating layer 220 may reflect at least a portion of the light, which is emitted from the light source 120, enters the wavelength filter layer 300 but may be reflected without being transmitted, and travels toward one surface of the first substrate 110, toward the reflective film 210 and/or the wavelength filter layer 300. Thus, it may be possible to minimize leakage of light and to vary an angle of incidence at which the light is incident on the wavelength filter layer 300.

The reflective coating layer 220 may include a reflective material. The reflective coating layer 220 may be made of materials applicable to the reflective film 210 described above. For example, the reflective coating layer 220 may include a metal material such as silver (Ag), copper (Cu), aluminum (Al), nickel (Ni), lanthanum (La), an alloy thereof, Indium Tin Oxide (ITO), Indium Zinc Oxide (IZO), Indium Tin-Zinc Oxide (ITZO) and the like, but is not limited thereto. The reflective coating layer 220 may be made of a material different from that of the reflective film 210.

The reflective coating layer 220 may include an upper surface, a lower surface and a side surface. The lower surface of the reflective coating layer 220 may be placed on one surface of the first substrate 110. The upper surface of the reflective coating layer 220 faces the lower surface of the wavelength filter layer 300. Each of the upper surface and the lower surface of the reflective coating layer 220 may be located on one plane, and the plane on which the upper surface may be located and the plane on which the lower surface may be located may be substantially parallel to each other. Accordingly, the reflective coating layer 220 may have a uniform thickness $h_3$ (i.e., a distance from the lower surface of the reflective coating layer 220 to the upper surface of the reflective coating layer 220 in the third direction Z) as a whole. The thickness $h_3$ of the reflective coating layer 220 may be less than the thickness $h_2$ of the reflective film 210, and may be less than or equal to the height $h_1$ of the light source 120.

The side surface of the reflective coating layer 220 may be adjacent to the side surface of the light source 120 and/or the sidewall of the opening 210h of the reflective film 210. In an embodiment, the plane on which the side surface of the reflective coating layer 220 may be located may have an angle of about 90 degrees with respect to the plane on which the upper surface and/or the lower surface of the reflective coating layer 220 may be located. However, the disclosure is not limited thereto, and the upper surface of the reflective coating layer 220 may have a height (i.e., a distance from the lower surface of the reflective coating layer 220 to the upper surface of the reflective coating layer 220 in the third direction Z) from the lower surface, which increases as it gets closer to the side surface of the reflective film 210 and/or the light source 120. Therefore, an angle between the plane on which the side surface of the reflective coating layer 220 may be located and the plane on which the upper surface of the reflective coating layer 220 may be located may not be about 90 degrees.

The wavelength filter layer 300 may include an upper surface, a lower surface and a side surface. The lower surface of the wavelength filter layer 300 faces the upper surface of the light source 120. Each of the upper surface and the lower surface of the wavelength filter layer 300 may be located on one plane, and the plane on which the upper surface may be located and the plane on which the lower surface may be located may be substantially parallel to each other. Accordingly, the wavelength filter layer 300 may have a uniform thickness as a whole. A width $2W_3$ of the upper surface of the wavelength filter layer 300 and a width $2W_3$ of the lower surface of the wavelength filter layer 300 may be equal to each other. Therefore, an angle between the plane on which the side surface of the wavelength filter layer 300 may be located and the plane on which the upper surface and/or the lower surface of the wavelength filter layer 300 may be located may be about 90 degrees. That is, the side surfaces of multiple refractive layers (see FIG. 7), forming the wavelength filter layer 300, to be described later, may be arranged in parallel.

The width $2W_3$ of the wavelength filter layer 300 may be larger than the width $2W_2$ of the opening 210h corresponding to the wavelength filter layer 300 to expose the light source 120 in the third direction Z. Therefore, the side surface of the wavelength filter layer 300 may at least partially overlap the reflective film 210 in the third direction Z, and a portion of the upper surface and/or the lower surface of the wavelength filter layer 300 may overlap the reflective film 210 in the third direction Z.

The width $2W_3$ of the wavelength filter layer 300 may be larger than the width $2W_2$ of the opening 210h to completely cover the space of the opening 210h. Accordingly, it may be possible to reduce light which leaks into the space between the reflective film 210 and the wavelength filter layer 300. A detailed description of a path of the light emitted from the light source 120 to the wavelength filter layer 300 will be given later with reference to FIG. 10.

The adhesive layer AM is disposed between the reflective film 210 and the wavelength filter layer 300. The adhesive layer AM may include an upper surface AMa, a lower surface AMb, and side surfaces AMsi and AMso. The lower surface AMb of the adhesive layer AM may be placed on the reflective film 210. The upper surface AMa of the adhesive layer AM may face the lower surface AMb of the adhesive layer AM. Each of the upper surface AMa and the lower surface AMb of the adhesive layer AM may be located on one plane, and the plane on which the upper surface AMa of the adhesive layer AM may be located and the plane on which the lower surface AMb of the adhesive layer AM may be located may be substantially parallel to each other. Accordingly, the adhesive layer AM may have a uniform thickness as a whole. In an embodiment, the thickness of the adhesive layer AM may be about 50 μm. An angle between the plane on which the side surface AMsi, AMso of the adhesive layer AM is located and the plane on which the upper surface AMa and/or the lower surface AMb of the adhesive layer AM may be located may be about 90 degrees.

The adhesive layer AM may be formed directly on the upper surface of the reflective film 210, and the lower surface AMb of the adhesive layer AM may be in contact with the upper surface of the reflective film 210. The lower surface AMb of the adhesive layer AM may be disposed on and in contact with a portion of the upper surface of the reflective film 210. That is, the adhesive layer AM may overlap a portion of the reflective film 210 in the third direction Z. The lower surface AMb of the adhesive layer AM may be disposed in a region close to the opening 210h on the upper surface of the reflective film 210. The upper surface AMa of the adhesive layer AM may be in contact with the lower surface of the wavelength filter layer 300. The upper surface AMa of the adhesive layer AM may be disposed on an edge portion of the wavelength filter layer 300 to overlap a portion of the wavelength filter layer 300 in the third direction Z. The adhesive layer AM may be formed in a substantially annular shape, for example, a donut or torus shape in plan view.

The adhesive layer AM may be disposed to completely cover a region where the reflective film 210 and the wavelength filter layer 300 overlap each other in the third direction Z. A width $W_3$-$W_2$ of the adhesive layer AM may be equal to a difference between a length $W_3$ of the radius of the wavelength filter layer 300 and a length $W_2$ of the radius of the opening 210$h$.

The adhesive layer AM may include two side surfaces AMsi and AMso in a schematic cross-sectional view. The side surfaces AMsi and AMso of the adhesive layer AM may include an inner side surface AMsi disposed toward the inside of the corresponding opening 210$h$ and an outer side surface AMso disposed toward the outside of the opening 210$h$. The plane including the inner side surface AMsi of the adhesive layer AM may be aligned in parallel with the sidewall of the reflective film 210 formed by the opening 210$h$ in the third direction Z. The plane including the outer side surface AMso of the adhesive layer AM may be aligned in parallel with the side surface of the wavelength filter layer 300 in the third direction Z.

The diffusion plate 400 may be disposed above the wavelength filter layer 300. The diffusion plate 400 may have a planar shape substantially similar to that of the display panel 70. For example, when the display panel 70 has a rectangular planar shape, the diffusion plate 400 may also have a rectangular planar shape similar thereto. The diffusion plate 400 and the display panel 70 may have substantially the same size in plan view, but the disclosure is not limited thereto.

The diffusion plate 400 may be disposed above the wavelength filter layer 300 to be spaced apart from the wavelength filter layer 300. A separation distance from the upper surface of the first substrate 110 to the lower surface of the diffusion plate 400 in the third direction Z may be defined as an optical distance (OD). In an embodiment, the optical distance (OD) may be less than or equal to the distance Ray between the light sources 120 in the second direction Y. Thus, the optical distance (OD) may be less than or equal to about 50 mm. However, without being limited thereto, the optical distance (OD) may be greater than 50 mm.

In order to minimize the loss of light emitted from the light source 120 and to maximize the improvement of the luminance uniformity even though the optical distance (OD) is shortened, it is preferable to establish an appropriate arrangement relationship among the light source 120, the reflective film 210 and the wavelength filter layer 300. Hereinafter, a relative positional relationship among the light source 120 corresponding to an individual light source, the reflective film 210, the opening 210$h$ and the wavelength filter layer 300 in order to minimize the loss of light and maximize the luminance uniformity will be described in detail with reference to FIG. 6.

The light source 120 may be disposed at the center of one surface of the first substrate 110 exposed by the opening 210$h$. The length RLy of the side of the light source 120 in the second direction Y may be smaller than the width $2W_2$ of the opening 210$h$ such that the light source 120 and the reflective film 210 are spaced apart from each other in the second direction Y. Thus, the light source 120 and the reflective film 210 may be disposed on the first substrate 110 at a predetermined interval such that at least a portion of one surface of the first substrate 110 is exposed in the third direction Z.

In an exemplary embodiment, the light source 120 may emit light from the center of the upper surface of the light source 120. The light emitted by the light source 120 may travel substantially from the upper surface of the light source 120 in the third direction Z. A portion of the light emitted by the light source 120 may travel toward the side in the third direction Z at a predetermined angle with the plane on which the upper surface of the light source 120 is located. The light emitted from the light source 120 may have an optical path within an orientation angle range of the light source 120. In an embodiment, the orientation angle of the light source 120 may be about 140 degrees.

For example, when a reference line $L_0$ passing through the center of the light source 120 in the third direction Z is defined, a traveling path of light emitted from the light source 120 may have a first angle $\theta_L$ of an acute angle with respect to the reference line $L_0$. In an embodiment, the first angle $\theta_L$ between the traveling path of light emitted from the light source 120 and the reference line $L_0$ may be about 70 degrees or less. That is, a maximum value of the first angle $\theta_L$ between the traveling path of light emitted from the light source 120 and the reference line $L_0$ may be about 70 degrees.

When the traveling path of light when the first angle $\theta_L$ between the traveling path of light emitted from the light source 120 and the reference line $L_0$ has a maximum value is defined as a reference path line $L_M$, the light emitted from the light source 120 may travel substantially between the reference line $L_0$ and the reference path line $L_M$. The reference path line $L_M$ having the maximum angle from the reference line $L_0$ may pass through the wavelength filter layer 300. Thus, when a point, at which the plane on which the lower surface of the wavelength filter layer 300 is located and the reference path line $L_M$ meet, is positioned inside the opening 210$h$ and the wavelength filter layer 300, it may be advantageous for the light emitted from the light source 120 to enter the wavelength filter layer 300. That is, by forming a width $W_1$ between the reference line $L_0$ and the point, at which the plane on which the lower surface of the wavelength filter layer 300 is located and the reference path line $L_M$ meet, to be smaller than a radius $W_2$ of the opening 210$h$ and a radius $W_3$ of the wavelength filter layer 300, it may be effective to prevent the light emitted from the light source 120 from leaking into a separation space between the wavelength filter layer 300 and the reflective film 220 and cause the light to enter the wavelength filter layer 300, thereby minimizing the loss of light.

According to the above-described embodiment, by appropriately arranging the light source 120, the reflective film 210 and the wavelength filter layer 300 even though the wavelength filter layer 300 may be formed only on a partial region of one surface of the reflective film 210, it may be possible to efficiently cause the light emitted from the light source 120 to enter the wavelength filter layer 300. Since the wavelength filter layer 300 may be formed only on a partial region, it may be possible to reduce the material cost of the wavelength filter layer 300.

Figure 7:
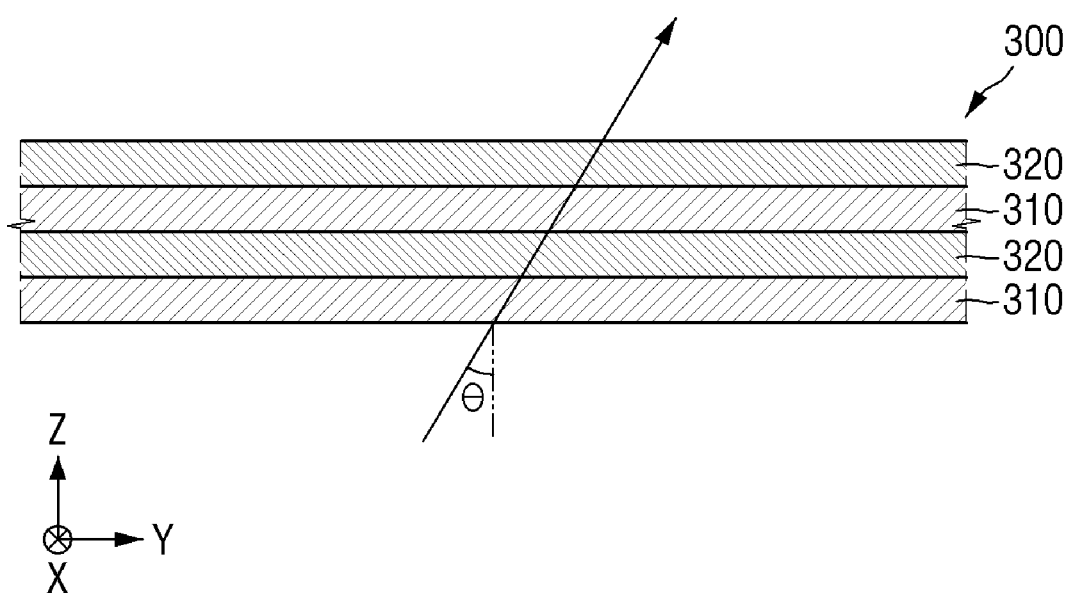
FIG. 7 is a schematic cross-sectional view of a wavelength filter layer according to an embodiment.

FIG. 7 is a schematic cross-sectional view of a wavelength filter layer according to an embodiment.

Referring to FIG. 7, the wavelength filter layer 300 may include multiple refractive layers. In an embodiment, the wavelength filter layer 300 may include a first refractive layer 310 having a first refractive index, and a second refractive layer 320 having a second refractive index different from the first refractive index. The first refractive layer 310 and the second refractive layer 320 may be alternately stacked in the thickness direction. By alternately stacking the first refraction layer 310 and the second refraction layer 320 in the thickness direction, the wavelength filter layer 300 may have a structure in which the first refractive layer 310, the second refractive layer 320, the first refractive layer 310 and the second refractive layer 320 are sequentially stacked in the thickness direction.

The upper surface of the wavelength filter layer 300 may be the upper surface of the second refractive layer 320, and the lower surface of the wavelength filter layer 300 may be the lower surface of the first refractive layer 310. The planes including the upper surface and the lower surface of the multiple refractive layers constituting the wavelength filter layer 300 may be parallel to each other, and the wavelength filter layer 300 may have a uniform thickness as a whole.

FIG. 7 illustrates an example where the wavelength filter layer 300 has a structure in which two refractive layers 310 and 320 having different refractive indexes are stacked repeatedly twice. However, the disclosure is not limited thereto, and the wavelength filter layer 300 may be formed by repeatedly stacking refractive layers having three or more refractive indexes, or may be formed by repeatedly stacking two refractive layers having different refractive indexes at least three times.

The refractive layers 310 and 320 included in the wavelength filter layer 300 may include a metal oxide or a metal material. For example, the metal oxide may be at least one of $SiO_2$, $TiO_2$, $Ti_3O_5$, $Ta_2O_5$ and $Y_2O_3$, and the metal material may be at least one of $MgF_2$, $Na_3AlF_6$, Al, Ag and Cr, but the disclosure is not limited thereto.

The wavelength filter layer 300 may transmit a portion of light incident on the wavelength filter layer 300 and reflect the remaining portion of the light. The wavelength filter layer 300 may be formed by alternately stacking two refractive layers 310 and 320 having different refractive indexes to repeatedly form a difference in refractive index. Thus, the light incident on the wavelength filter layer 300 may have a different transmittance according to the wavelength region thereof. That is, by adjusting the material and thickness of each of the refractive layers 310 and 320 to be stacked and/or the number of the refractive layers 310 and 320, it may be possible to adjust the transmittance of light in a specific wavelength region where an angle of incidence on the wavelength filter layer 300 is about 0 degrees.

For example, the thicknesses of the refractive layers 310 and 320 for optimally increasing the reflectivity of light in a specific wavelength region having an incident angle of about 0 degrees on the wavelength filter layer 300 can be adjusted according to the wavelength and refractive index of light. When the refractive index of the refractive layer to be stacked is n and the wavelength to be reflected is $\lambda_1$, by alternately stacking a low refractive layer and a high refractive layer with a thickness of $(\lambda_1)/(4n)$, it may be possible to effectively reflect light in a specific wavelength ($\lambda_1$) region.

The light incident on the wavelength filter layer 300 may have a different transmittance (or reflectance) according to the incident angle. Hereinafter, the transmittance according to the incident angle of light of the wavelength filter layer 300 will be described using, as an example, where the light source 120 emits blue light having a wavelength band of about 450 nm and the light having the wavelength band of about 450 nm is incident on the wavelength filter layer 300.

Figure 8:
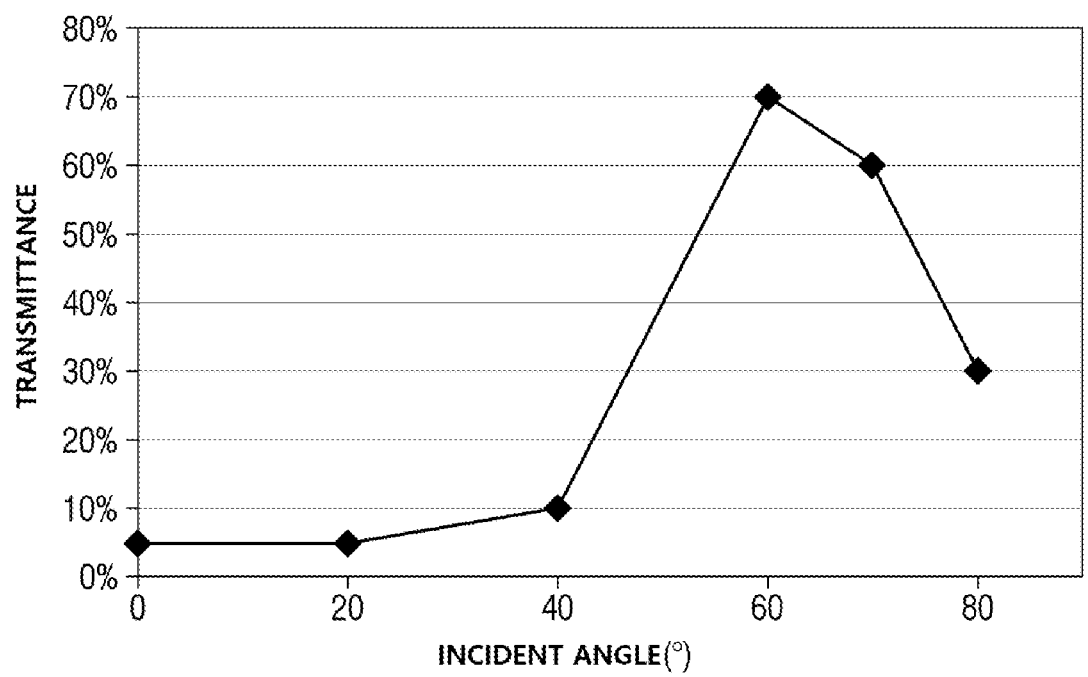
FIG. 8 is a graph showing the transmittance according to an angle at which light having a wavelength band of about 450 nm is incident on the wavelength filter layer.

FIG. 8 is a graph showing the transmittance according to an angle at which light having a wavelength band of about 450 nm is incident on the wavelength filter layer.

In the graph of FIG. 8, an X axis represents a second angle θ (incident angle) at which light having a wavelength band of about 450 nm is incident on the wavelength filter layer 300, and a Y axis represents the transmittance of light incident on the wavelength filter layer 300. The second angle θ (incident angle) at which light is incident on the wavelength filter layer 300 may be defined as an angle with respect to a normal line perpendicular to the lower surface of the wavelength filter layer 300, as shown in FIG. 7.

Referring to FIG. 8, the light exhibits a low transmittance when the second angle θ is small, but the transmittance increases significantly when the second angle θ exceeds 40 degrees. For example, when the second angle θ ranges from about 0 degrees to about 40 degrees, the transmittance ranges from about 5% to about 10%. That is, about 5% to about 10% of the light incident on the wavelength filter layer 300 at an angle of 0 degrees to about 40 degrees is transmitted through the wavelength filter layer 300 while about 90% to about 95% of the light corresponding to the remaining portion is not transmitted through the wavelength filter layer 300 and is reflected toward the first substrate 110. On the other hand, when the second angle θ at which light emitted from the light source 120 is incident on the wavelength filter layer 300 ranges from about 55 degrees to about 70 degrees, the transmittance ranges from about 50% to about 70%, which means that about 50% to about 70% of the light incident on the wavelength filter layer 300 may be transmitted through the wavelength filter layer 300 while about 30% to about 50% of the light corresponding to the remaining portion may be reflected without being transmitted through the wavelength filter layer 300. That is, the wavelength filter layer 300 can relatively reduce the transmittance of light traveling in the normal direction (i.e., light having a small incident angle on the wavelength filter layer 300). When the wavelength filter layer 300 having the above-described characteristics is provided above the light source 120 having a relatively strong luminance in the normal direction, it may be possible to improve the non-uniformity of light luminance according to the angle.

Figure 9:
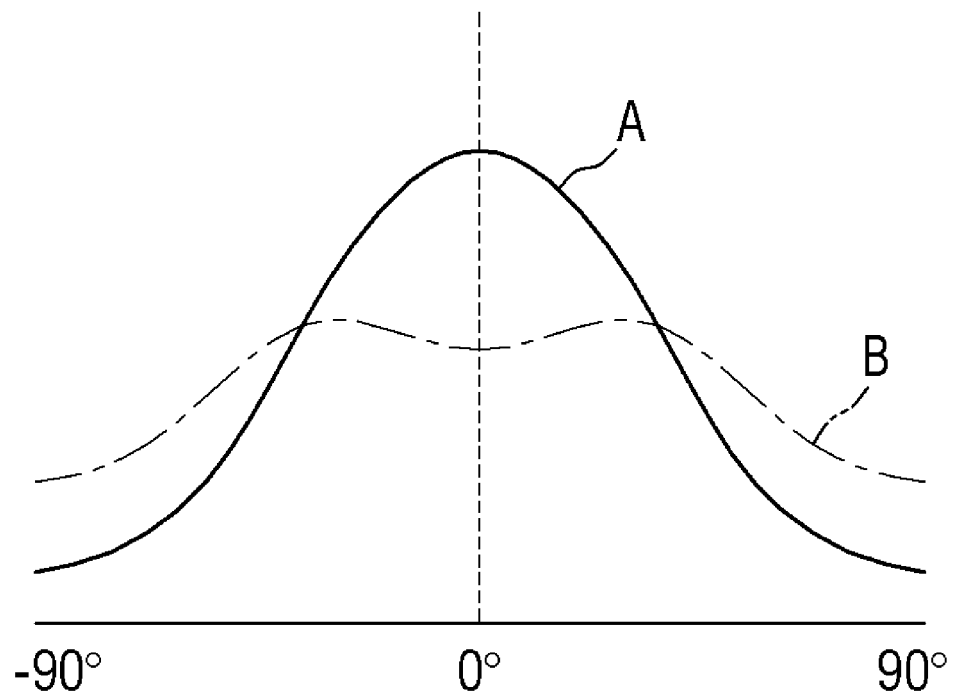
FIG. 9 is a graph showing the luminance of the light source according to the ground angle.

FIG. 9 is a graph showing the luminance of the light source according to the ground angle.

In FIG. 9, an X axis represents the ground angle from the light source 120, and a Y axis represents the luminance. FIG. 9 shows the luminance of the light source 120 having an orientation angle of about 140 degrees according to the ground angle. Graph A shows the luminance according to the ground angle when the wavelength filter layer 300 is not disposed between the light source 120 and the diffusion plate 400. Graph B shows the luminance according to the ground angle when the wavelength filter layer 300 is disposed between the light source 120 and the diffusion plate 400.

When the wavelength filter layer 300 is not disposed between the light source 120 and the diffusion plate 400, as shown in graph A, since the light emitted from the light source 120, which is formed of an LED chip, is substantially concentrated at the center of an upper portion, the luminance is high at a ground angle of about −70 degrees to about 70 degrees, while the luminance is sharply reduced at a ground angle of about −90 degrees to −70 degrees and at a ground angle of about 70 degrees to 90 degrees. That is, a central portion of the light source 120 in the third direction Z is bright, but its periphery is dark. Accordingly, the uniformity of luminance may be lowered.

When the wavelength filter layer 300 is disposed between the light source member 100 and the diffusion plate 400, the wavelength filter layer 300 serves to diffuse the light emitted from the light source 120. Accordingly, as shown in graph B, the luminance according to the ground angle may be substantially uniform as compared with graph A.

As in the embodiment, when the wavelength filter layer 300 is disposed between the light source member 100 and the diffusion plate 400, the light emitted from the light source 120 and incident on the diffusion plate 400 is diffused primarily by the wavelength filter layer 300. Therefore, it may be possible to improve the luminance uniformity which decreases as the optical distance (OD) decreases.

Figure 10:
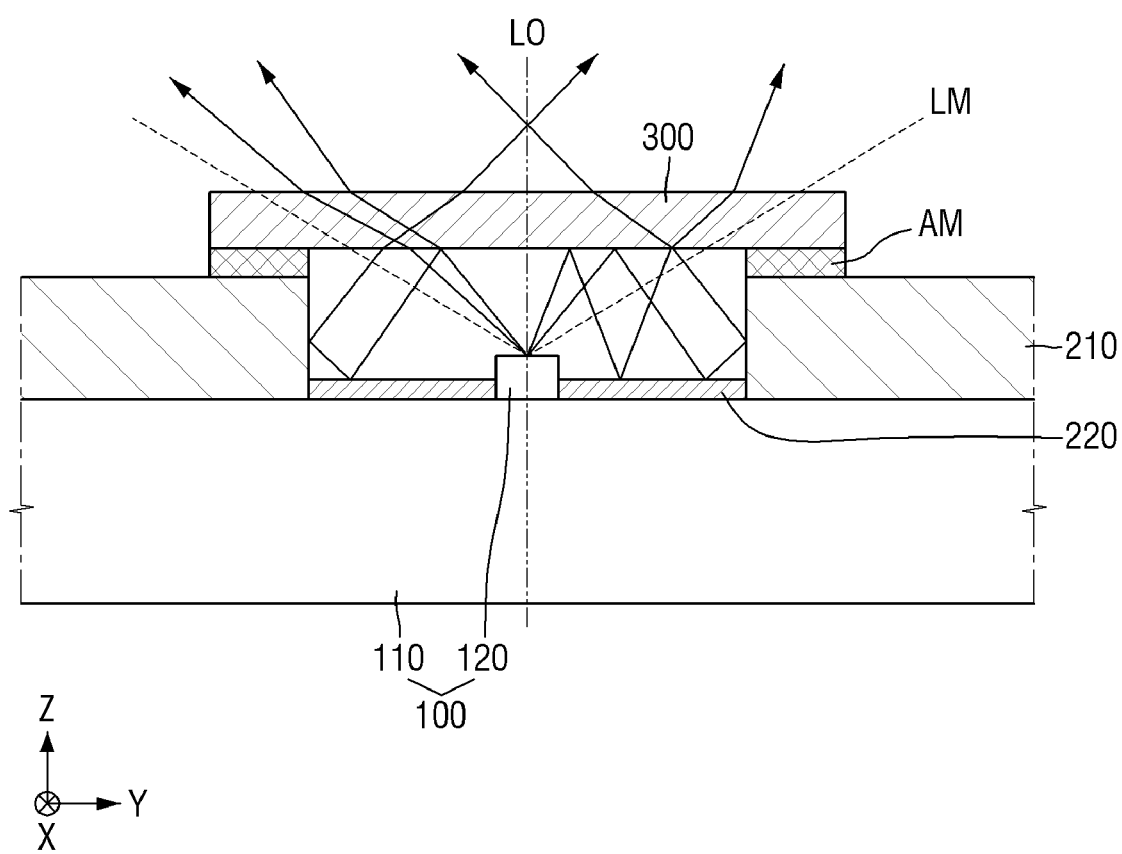
FIG. 10 is a schematic view showing a traveling path of light emitted from a light source according to an embodiment.

FIG. 10 is a schematic view showing a traveling path of light emitted from a light source according to an embodiment.

Referring to FIG. 10, the incident angle of light emitted from the light source 120 and incident on the wavelength filter layer 300 may range substantially from about 0 degrees to about 70 degrees. When the incident angle of light emitted from the light source 120 and incident on the wavelength filter layer 300 ranges from about 0 degrees to about 40 degrees, the incident light may be substantially reflected by the lower surface of the wavelength filter layer 300 to travel toward the first substrate 110, and at least a portion of the incident light may be transmitted through the wavelength filter layer 300 and emitted toward the display panel 70. The light reflected by the lower surface of the wavelength filter layer 300 and traveling toward the first substrate 110 may be reflected by the reflective coating layer 220 disposed on one surface of the first substrate 110 to re-enter the wavelength filter layer 300. In this example, according to the incident angle of the re-entering light, a portion of the re-entering light may be reflected again or transmitted through the wavelength filter layer 300. As shown in FIG. 8, when the incident angle of the light emitted from the light source 120 and incident on the wavelength filter layer 300 is about 0 degrees to about 40 degrees, a ratio of the light transmitted through the wavelength filter layer 300 to the light reflected may be about 1:9.

When the incident angle of light emitted from the light source 120 and incident on the wavelength filter layer 300 ranges from about 40 degrees to about 50 degrees, a portion of the incident light may be substantially reflected by the lower surface of the wavelength filter layer 300 to travel toward the first substrate 110, and the remaining portion of the incident light may be transmitted through the wavelength filter layer 300 and emitted toward the display panel 70. Similarly, the light reflected by the lower surface of the wavelength filter layer 300 and traveling toward the first substrate 110 may be reflected by the reflective coating layer 220 disposed on one surface of the first substrate 110 to re-enter the wavelength filter layer 300. According to the incident angle of the re-entering light, a portion of the re-entering light may be reflected again or transmitted through the wavelength filter layer 300. As shown in FIG. 8, when the incident angle of the light emitted from the light source 120 and incident on the wavelength filter layer 300 is about 40 degrees to about 50 degrees, a ratio of the light transmitted through the wavelength filter layer 300 to the light reflected may be about 5:5.

When the incident angle of light emitted from the light source 120 and incident on the wavelength filter layer 300 ranges from about 50 degrees to about 70 degrees, the incident light may be substantially transmitted through the wavelength filter layer 300 and emitted toward the display panel 70, and at least a portion of the incident light may be reflected by the lower surface of the wavelength filter layer 300 to travel toward the first substrate 110. Similarly, the light reflected by the lower surface of the wavelength filter layer 300 and traveling toward the first substrate 110 may be reflected by the reflective coating layer 220 disposed on one surface of the first substrate 110 to re-enter the wavelength filter layer 300. According to the incident angle of the re-entering light, a portion of the re-entering light may be reflected again or transmitted through the wavelength filter layer 300. As shown in FIG. 8, when the incident angle of the light emitted from the light source 120 and incident on the wavelength filter layer 300 is about 50 degrees to about 70 degrees, a ratio of the light transmitted through the wavelength filter layer 300 to the light reflected may be about 7:3.

Although it is illustrated in the drawing that the light emitted from the light source 120 travels substantially between the reference line $L_0$ and the reference path line $L_M$, the traveling direction of the light emitted from the light source 120 is not limited thereto. At least a portion of the light emitted from the light source 120 may travel in a direction (e.g. an outward direction of the reference path line $L_M$) other than the direction between the reference line $L_0$ and the reference path line $L_M$.

FIG. 11 is a schematic cross-sectional view of a wavelength filter layer according to another embodiment.

FIG. 11 illustrates that a wavelength filter layer 300_1 may include a wavelength filter substrate 330.

Referring to FIG. 11, the wavelength filter substrate 330 may be disposed on the second refractive layer 320 disposed at the uppermost position in the third direction. The wavelength filter substrate 330 may include a plastic film having high transmittance. For example, the wavelength filter substrate 330 may be a PET film.

Although not shown, the wavelength filter substrate 330 may be disposed on the lower surface of the first refractive layer 310. The wavelength filter substrate 330 may be disposed on the upper side of the wavelength filter layer 300_1 to emit the light emitted from the light source 120 toward the display panel 70 through the upper surface of the wavelength filter substrate 330. However, the disclosure is not limited thereto. The wavelength filter substrate 330 may be disposed on the lower side of the wavelength filter layer 300_1, and the light emitted from the light source 120 may be incident on the lower surface of the wavelength filter substrate 330.

FIGS. 12 to 15 are schematic cross-sectional views of a light source member, a reflective member and a wavelength filter layer according to other embodiments.

Figure 12:
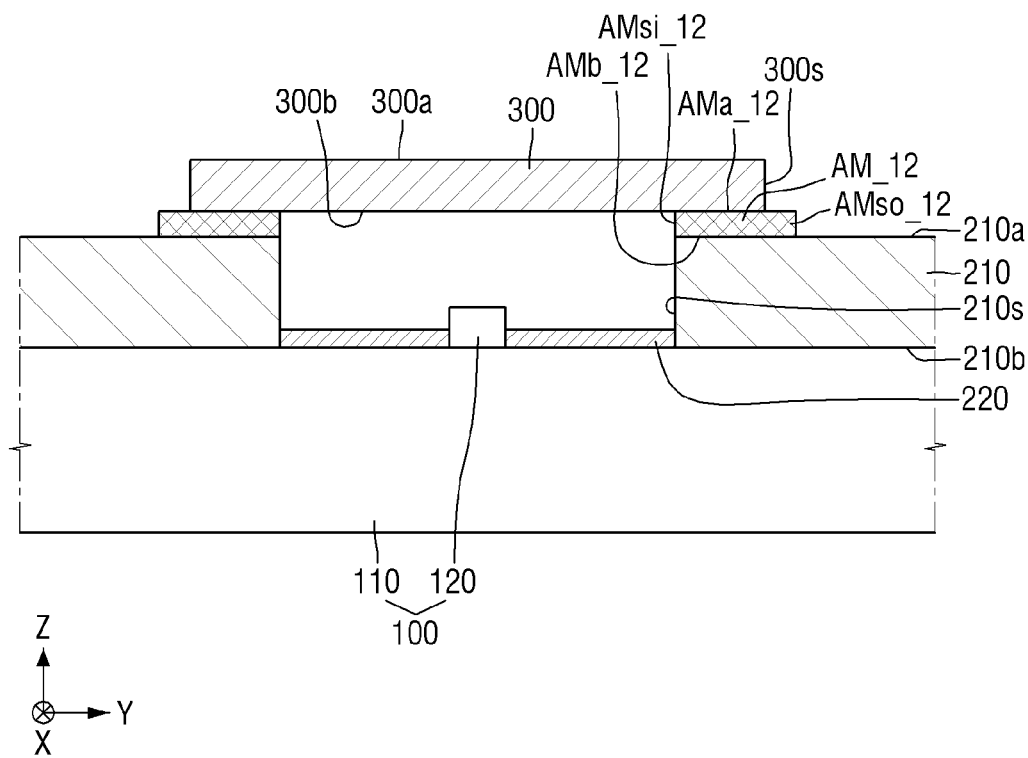
FIG. 12 is a schematic cross-sectional view of a light source member, a reflective member and a wavelength filter layer according to an embodiment.

FIG. 12 illustrates that an outer side surface AMso_12 of an adhesive layer AM_12 may protrude more outward than a side surface 300s of the wavelength filter layer 300. For example, as shown in FIG. 12, an inner side surface AMsi_12 of the adhesive layer AM_12 may be aligned with a side surface 210s of the reflective film 210, and the adhesive layer AM_12 extends more outward than the side surface 300s of the wavelength filter layer 300. Accordingly, the outer side surface AMso_12 of the adhesive layer AM_12 and the side surface 300s of the wavelength filter layer 300 may not be aligned in parallel in the third direction Z.

The adhesive layer AM_12 may be disposed in contact with an upper surface 210a of the reflective film 210. The entire lower surface AMb_12 of the adhesive layer AM_12 may be in contact with a portion of the upper surface 210a of the reflective film 210. The wavelength filter layer 300 may be formed in contact with an upper surface AMa_12 of the adhesive layer AM_12. The wavelength filter layer 300 may partially expose an outer edge portion of the upper surface AMa_12 of the adhesive layer AM_12. Although not shown, in plan view, the adhesive layer AM_12 may cover the entire region where the wavelength filter layer 300 and the reflective film 210 overlap each other, and extend in an outward direction of the opening 210h to cover the upper surface 210a of the reflective film 210 exposed by the wavelength filter layer 300.

The embodiment may be configured such that the adhesive layer AM_12 may be patterned and disposed on the upper surface of the reflective film 210 on which the opening 210h is not formed and the opening 210h is formed in the reflective film 210 by using a method such as punching. For example, the adhesive layer AM_12 may be disposed on the upper surface of the reflective film 210 on which the opening 210h is not disposed, to correspond to the light source 120 in the third direction Z. The diameter of the adhesive layer AM_12 may be larger than the width $2W_3$ of the wavelength filter layer 300. In the reflective film 210 on which the adhesive layer AM_12 is disposed, the opening 210h having the width $2W_2$ smaller than the width $2W_3$ of the wavelength filter layer 300 may be formed to correspond to the light source 120 in the third direction Z by punching or other suitable method.

Figure 13:
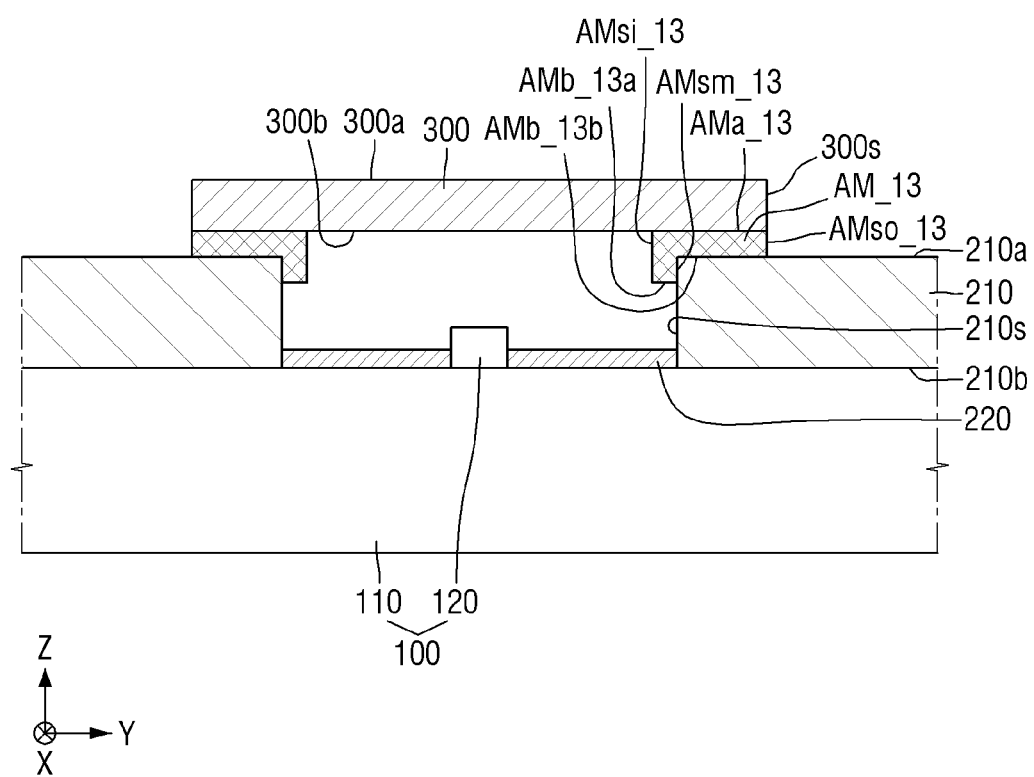
FIG. 13 is a schematic cross-sectional view of a light source member, a reflective member and a wavelength filter layer according to an embodiment.

FIG. 13 illustrates that an inner side surface AMsi_13 of an adhesive layer AM_13 may protrude more inward than the side surface 210s of the reflective film 210. For example, as shown in FIG. 13, the inner side surface AMsi_13 of the adhesive layer AM_13 may cover the upper surface of the reflective film 210 and extend to the inner side where the light source 120 is disposed to cover a portion of the side surface of the reflective film 210.

For example, the adhesive layer AM_13 may include an upper surface AMa_13 formed of one plane, lower surfaces AMb_13a and AMb_13b formed of two planes, an inner side surface AMsi_13 formed of one plane, and outer side surfaces AMso_13 and AMso_13 formed of two planes. The upper surface AMa_13 of the adhesive layer AM_13 may be in contact with the lower surface of the wavelength filter layer 300, and the lower surface AMb_13b of the adhesive layer AM_13 may be in contact with the upper surface of the reflective film 210. The lower surface AMb_13a of the adhesive layer AM_13 disposed on the side surface of the reflective film 210 faces the reflective coating layer 220 disposed on the first substrate 110 in the third direction Z. The inner side surface AMsi_13 of the adhesive layer AM_13 may overlap the reflective coating layer 220 disposed on the first substrate 110 in the third direction Z, and the outer side surface AMso_13 of the adhesive layer AM_13 may be in contact with the side surface of the reflective film 210.

The embodiment may be configured such that the adhesive layer AM_13 may be coated on the upper surface of the reflective film 210 having the opening 210h formed therein. For example, the adhesive layer AM_13 may be disposed on the rim of the opening 210h on the upper surface of the reflective film 210. In this example, the adhesive layer AM_13 may be disposed even on a portion of a region of the opening 210h disposed in the reflective film 210 to cover a portion of the side surface of the reflective film 210.

Figure 14:
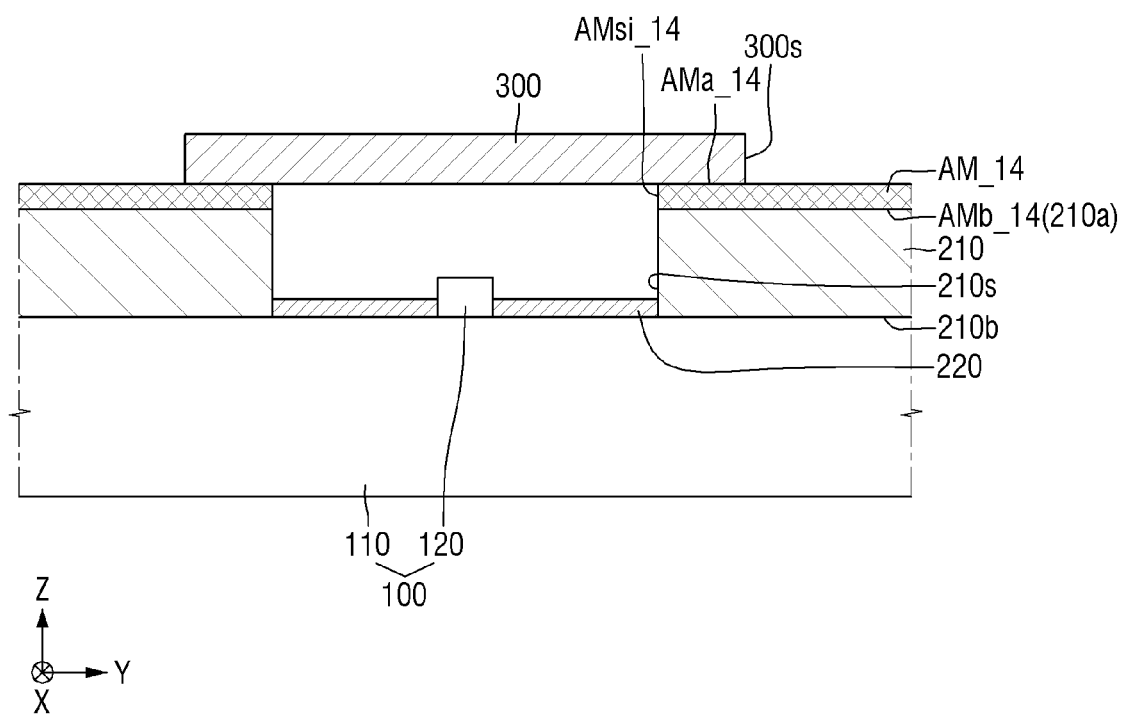
FIG. 14 is a schematic cross-sectional view of a light source member, a reflective member and a wavelength filter layer according to an embodiment.

FIG. 14 illustrates that an adhesive layer AM_14 may be disposed on the entire upper surface 210a of the reflective film 210 except for the opening 210h. For example, as shown in FIG. 14, the adhesive layer AM_14 may completely cover the upper surface 210a of the reflective film 210 exposed by the wavelength filter layer 300.

An inner side surface AMsi_14 of the adhesive layer AM_14 may be aligned in parallel with the side surface 210s of the reflective film 210 in the third direction Z. The adhesive layer AM_14 may extend more outward than the side surface 300s of the wavelength filter layer 300, and may be disposed even on the side surface of the reflective film 210 formed by the adjacent opening (not shown). Thus, in the embodiment, an outer side surface of the adhesive layer AM_14 may not be formed.

The adhesive layer AM_14 may be disposed in contact with the upper surface 210a of the reflective film 210. The entire lower surface AMb_14 of the adhesive layer AM_14 may be in contact with the entire upper surface 210a of the reflective film 210. The wavelength filter layer 300 may be formed in contact with an upper surface AMa_14 of the adhesive layer AM_14. The wavelength filter layer 300 may expose a portion of the upper surface AMa_14 of the adhesive layer AM_14. The upper surface AMa_14 of the adhesive layer AM_14 exposed by the wavelength filter layer 300 may overlap the reflective film 210 exposed by the wavelength filter layer 300 in the third direction Z.

The embodiment may be configured such that the adhesive layer AM_14 may be disposed on the entire upper surface of the reflective film 210 on which the opening 210h is not formed and the opening 210h is formed in the reflective film 210 by using a method such as punching. For example, the adhesive layer AM_14 may be disposed on the entire upper surface of the reflective film 210 on which the opening 210h is not disposed. The area of the adhesive layer AM_14 may be smaller than or equal to the area of the reflective film 210. In the reflective film 210 on which the adhesive layer AM_14 is disposed, the opening 210h having the width $2W_2$ smaller than the width $2W_3$ of the wavelength filter layer 300 may be formed to correspond to the light source 120 in the third direction Z by a method such as punching.

Figure 15:
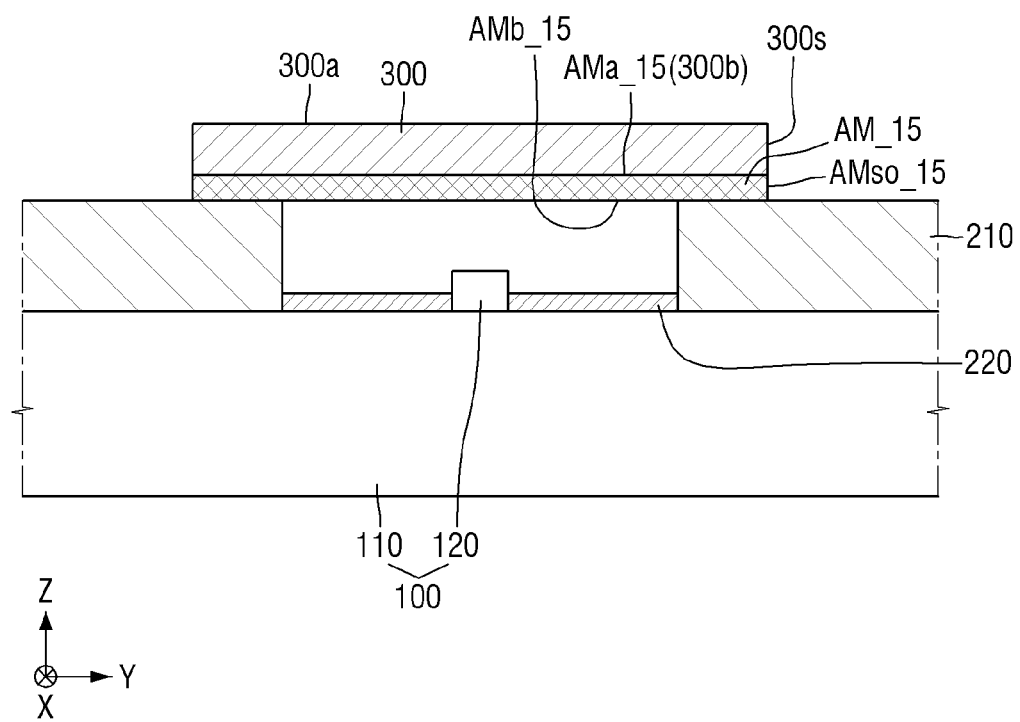
FIG. 15 is a schematic cross-sectional view of a light source member, a reflective member and a wavelength filter layer according to an embodiment.

FIG. 15 illustrates that an adhesive layer AM_15 may be disposed on the entire lower surface 300b of the wavelength filter layer 300. For example, as shown in FIG. 15, an outer side surface AMso_15 of the adhesive layer AM_15 may be aligned with the side surface 300s of the wavelength filter layer 300 and an inner side surface AMsi_15 of the adhesive layer AM_15 may not be formed.

The adhesive layer AM_15 may be disposed in contact with the lower surface 300b of the wavelength filter layer 300. The entire upper surface AMa_15 of the adhesive layer AM_15 may be in contact with the entire lower surface 300b of the wavelength filter layer 300. An edge portion of a lower surface AMb_15 of the adhesive layer AM_15 may be in contact with the upper surface 210a of the reflective film 210, and a region of the lower surface AMb_15 of the adhesive layer AM_15 corresponding to the opening 210h may be described to face the first substrate 110.

The embodiment may be configured such that after the adhesive layer AM_15 is entirely coated on one surface of a wavelength filter film and patterned to have a predetermined width $2W_3$, the one surface having the adhesive layer AM_15 is disposed in contact with the upper surface 210a of the reflective film 210. In this example, when the adhesive layer AM_15 is formed of a light transmitting material, the light emitted from the light source 120 can be incident on the wavelength filter layer 300 without loss of light.

Figure 16:
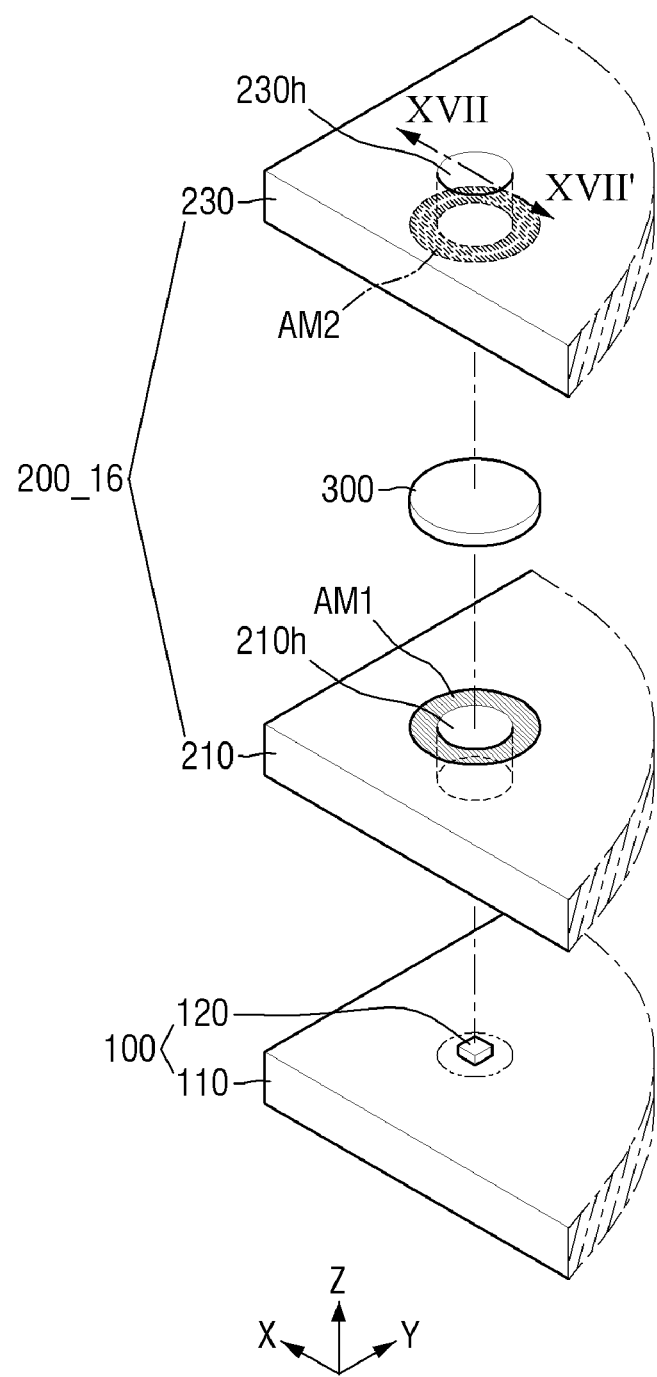
FIG. 16 is an exploded perspective view showing a portion of a backlight unit corresponding to one light source according to an embodiment.
Figure 17:
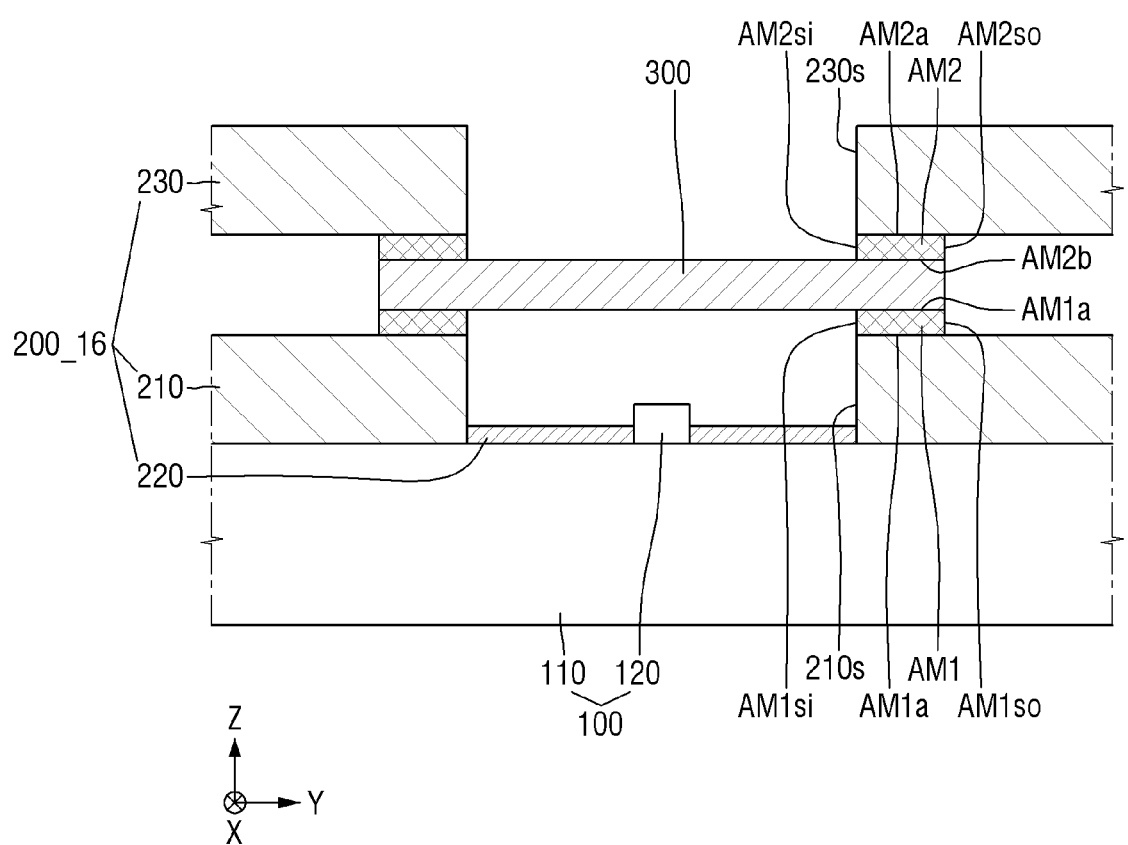
FIG. 17 is a schematic cross-sectional view of a light source member, a reflective member and a wavelength filter layer according to an embodiment.

FIG. 16 is an exploded perspective view showing a relative positional relationship among the light source member, the reflective member and the wavelength filter layer according to an embodiment. FIG. 17 is a schematic cross-sectional view taken along line XVII-XVII' of FIG. 16. FIGS. 16 and 17 illustrate a portion of the backlight unit 10 disposed corresponding to one light source 120.

Referring to FIGS. 16 and 17, the embodiment is different from the embodiment of FIG. 6 in that a second reflective film 230 may be provided above the wavelength filter layer 300. For example, a reflective member 200_16 includes a first reflective film 210, the reflective coating layer 220 and the second reflective film 230. In terms of arrangement of the respective components, in this embodiment, the reflective film 210 of FIG. 6 may be replaced with the first reflective film 210 and the opening 210h of FIG. 6 may be replaced with a first opening 210h.

The second reflective film 230 may be disposed above the first reflective film 210. The second reflective film 230 may have a shape substantially similar to that of the first reflective film 210. For example, when the first reflective film 210 has a rectangular planar shape, the second reflective film 230 may also have a rectangular planar shape similar thereto. Although not shown, in plan view, the first reflective film 210 and the second reflective film 230 may have substantially the same size, but the disclosure is not limited thereto.

Similarly to the first reflective film 210, the second reflective film 230 may include at least one second opening 230h. The second opening 230h may be formed to completely pass through the second reflective film 230. The second opening 230h may be formed in a cylindrical shape having a predetermined radius and a predetermined height. In an embodiment, the diameter of the second opening 230h may be the same as a width $2W_2$ of the first opening 210h formed in the first reflective film 210, and the height of the second opening 230h may be the same as the height of the second reflective film 230.

The first reflective film 210 and the second reflective film 230 may be spaced apart from each other in the third direction Z. The upper surface of the first reflective film 210 and the lower surface of the second reflective film 230 may face each other. The upper surface of the first reflective film 210 and the lower surface of the second reflective film 230 may be arranged substantially in parallel.

The first opening 210h and the second opening 230h having the same width $2W_2$ may be arranged to correspond to each other in the third direction Z. The plane on which a side surface 210s of the first reflective film 210 may be located and the plane on which a side surface 230s of the second reflective film 230 may be located may be aligned in parallel with each other in the third direction Z. That is, similarly to the first opening 210h, the second opening 230h may be disposed on the second reflective film 230 to correspond to one light source 120 on a one-to-one basis. Therefore, the second opening 230h may completely expose the light source 120 in the third direction Z.

The wavelength filter layer 300 may be disposed in a separation space between the first reflective film 210 and the second reflective film 230 in the third direction Z. The wavelength filter layer 300 may be disposed to overlap the first opening 210h and/or the second opening 230h in the thickness direction. As described above, the width $2W_3$ of the wavelength filter layer 300 may be larger than a width $22W_2$ of the first opening 210h and the second opening 230h. Therefore, the first reflective film 210 and the second reflective film 230 may at least partially overlap an edge portion of the wavelength filter layer 300 in the third direction Z.

An adhesive layer AM1, AM2 may be provided between the wavelength filter layer 300 and the first reflective film 210 and/or between the wavelength filter layer 300 and the second reflective film 230. A first adhesive layer AM1 may be disposed between the wavelength filter layer 300 and the first reflective film 210, and a second adhesive layer AM2 may be disposed between the wavelength filter layer 300 and the second reflective film 230.

The first adhesive layer AM1 disposed between the wavelength filter layer 300 and the first reflective film 210 may include an upper surface AM1a, a lower surface AM1b, an inner side surface AM1si and an outer side surface AM1so. Similarly, the second adhesive layer AM2 disposed between the wavelength filter layer 300 and the second reflective film 230 may include an upper surface AM2a, a lower surface AM2b, an inner side surface AM2si and an outer side surface AM2so.

The lower surface AM1b of the first adhesive layer AM1 may be placed on the first reflective film 210. The upper surface AM1a of the first adhesive layer AM1 may face the lower surface AM1b of the first adhesive layer AM1. Each of the upper surface AM1a and the lower surface AM1b of the first adhesive layer AM1 may be located on one plane. The plane on which the upper surface AM1a of the first adhesive layer AM1 may be located and the plane on which the lower surface AM1b of the first adhesive layer AM1 may be located may be substantially parallel to each other. Accordingly, the first adhesive layer AM1 may have a uniform thickness as a whole. An angle between the plane on which the side surface AM1si, AM1so of the first adhesive layer AM1 may be located and the plane on which the upper surface AM1a and/or the lower surface AM1b of the first adhesive layer AM1 may be located may be about 90 degrees.

The upper surface AM1a of the first adhesive layer AM1 may be in contact with the lower surface of the wavelength filter layer 300. The upper surface AM1a of the first adhesive layer AM1 may be disposed on an edge portion of the wavelength filter layer 300 to overlap a portion of the wavelength filter layer 300 in the third direction Z.

The lower surface AM2b of the second adhesive layer AM2 may be placed on the wavelength filter layer 300. The upper surface AM2a of the second adhesive layer AM2 may face the lower surface AM2b of the second adhesive layer AM2. Each of the upper surface AM2a and the lower surface AM2b of the second adhesive layer AM2 may be located on one plane. The plane on which the upper surface AM2a of the second adhesive layer AM2 may be located and the plane on which the lower surface AM2b of the second adhesive layer AM2 may be located may be substantially parallel to each other. Accordingly, the second adhesive layer AM2 may have a uniform thickness as a whole. An angle between the plane on which the side surface AM2si, AM2so of the second adhesive layer AM2 may be located and the plane on which the upper surface AM2a and the lower surface AM2b of the second adhesive layer AM2 may be located may be about 90 degrees.

The lower surface AM2b of the second adhesive layer AM2 may be in contact with the upper surface of the wavelength filter layer 300. The lower surface AM2b of the second adhesive layer AM2 may be disposed on an edge portion of the wavelength filter layer 300 to overlap a portion of the wavelength filter layer 300 in the third direction Z. The upper surface AM2a of the second adhesive layer AM2 may be in contact with the lower surface of the second reflective film 230. The upper surface AM2a of the second adhesive layer AM2 may be disposed on and in contact with a portion of the lower surface of the second reflective film 230. That is, the second adhesive layer AM2 may overlap a portion of the second reflective film 230 in the third direction Z.

The first adhesive layer AM1 and the second adhesive layer AM2 may be disposed to completely cover a region where the first reflective film 210 and the second reflective film 230 overlap the wavelength filter layer 300 in the third direction Z. Therefore, the width of the first adhesive layer AM1 and the second adhesive layer AM2 may be equal to a difference between the radius $W_3$ of the wavelength filter layer 300 and the radius $W_2$ of the opening 210h.

Referring to FIG. 17, the inner side surface AM1si of the first adhesive layer AM1 and the inner side surface AM2si of the second adhesive layer AM2 may be aligned in parallel in the third direction, and the outer side surface AM1so of the first adhesive layer AM1 and the outer side surface AM2so of the second adhesive layer AM2 may be aligned in parallel in the third direction. Therefore, the inner side surface AM1si of the first adhesive layer AM1, the inner side surface AM2si of the second adhesive layer AM2, the side surface 210s of the first reflective film 210 and the side surface 230s of the second reflective film 230 may be aligned in parallel in the third direction Z. The outer side surface AM1so of the first adhesive layer AM1, the outer side surface AM2so of the second adhesive layer AM2 and a side surface 350s of the wavelength filter layer 300 may be aligned in parallel in the third direction.

The second reflective film 230 may be disposed above the first reflective film 210 to prevent light emitted from the light source 120 from being visually recognized from the outside.

Figure 18:
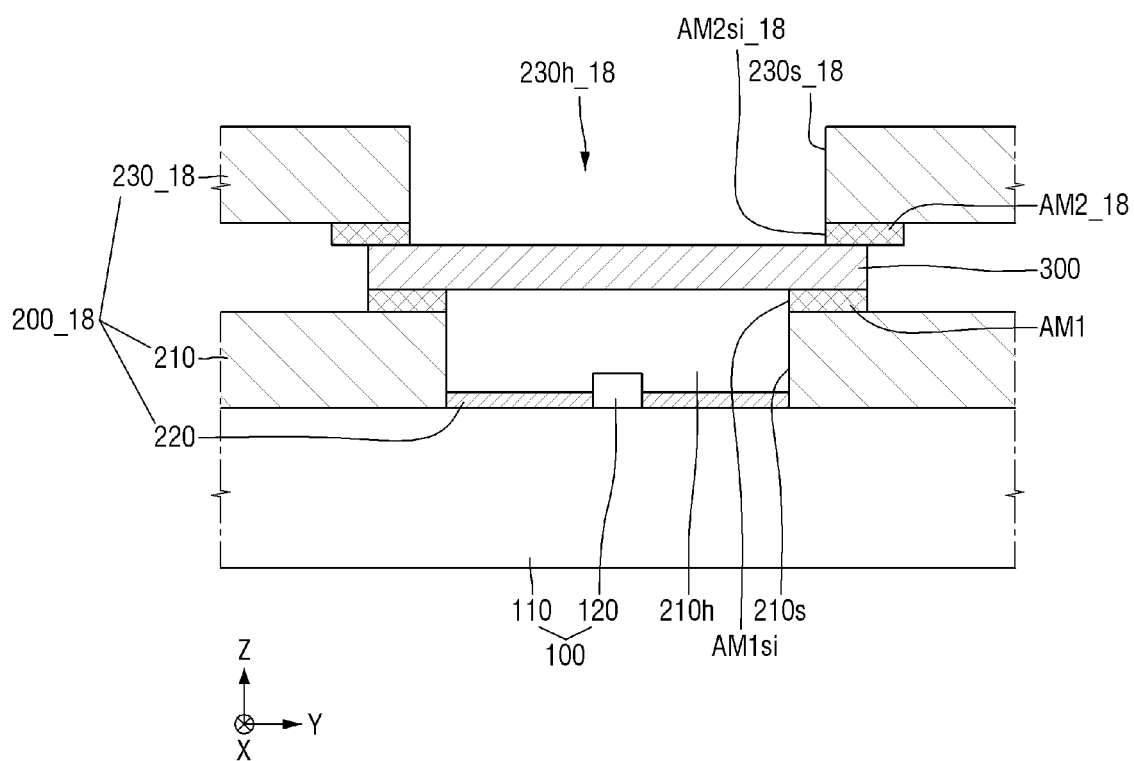
FIG. 18 is a schematic cross-sectional view of a light source member, a reflective member and a wavelength filter layer according to an embodiment.

FIG. 18 is a schematic cross-sectional view of a light source member, a reflective member and a wavelength filter layer according to an embodiment. The embodiment of FIG. 18 is different from the embodiment of FIG. 17 in that the size of a second opening 230h_18 disposed in a second reflective film 230_18 is different from that of the first opening 210h.

For example, the diameter of the second opening 230h may be larger than the width $2W_2$ of the first opening 210h and smaller than the width $2W_3$ of the wavelength filter layer 300. The second opening 230h_18 may expose at least a portion of a region where the first reflective film 210 and the wavelength filter layer 300 overlap each other in the thickness direction. Therefore, the width of the upper surface of the wavelength filter layer 300 exposed by the second openings 230h_18 may be larger than the width $2W_2$ of the first opening 210h and smaller than the width $2W_3$ of the wavelength filter layer 300.

The side surface 210s of the first reflective film 210 and the inner side surface AM1si of the first adhesive layer AM1 may be aligned in parallel in the third direction Z, and a side surfaces 230s_18 of a second reflective film 230_18 and an inner side surface AM2si_18 of a second adhesive layer AM2_18 may be aligned in parallel in the third direction Z. However, since the diameter of the second opening 230h_18 and the width $2W_2$ of the first opening 210h are different from each other, the side surface 210s of the first reflective film 210 and the side surface 230s_18 of the second reflective film 23018 may not be aligned in the third direction Z. For example, the side surface 230s_18 of the second reflective film 230_18 may be disposed more outward than the side surface 210s of the first reflective film 210.

As in the embodiment, when the diameter of the second opening 230h_18 formed in the second reflective film 23018 is larger than the width $2W_2$ of the first opening 210h formed in the first reflective film 210, it may be possible to prevent the light emitted from the wavelength filter layer 300 toward the display panel 70 from being visually recognized from the outside.

Figure 19:
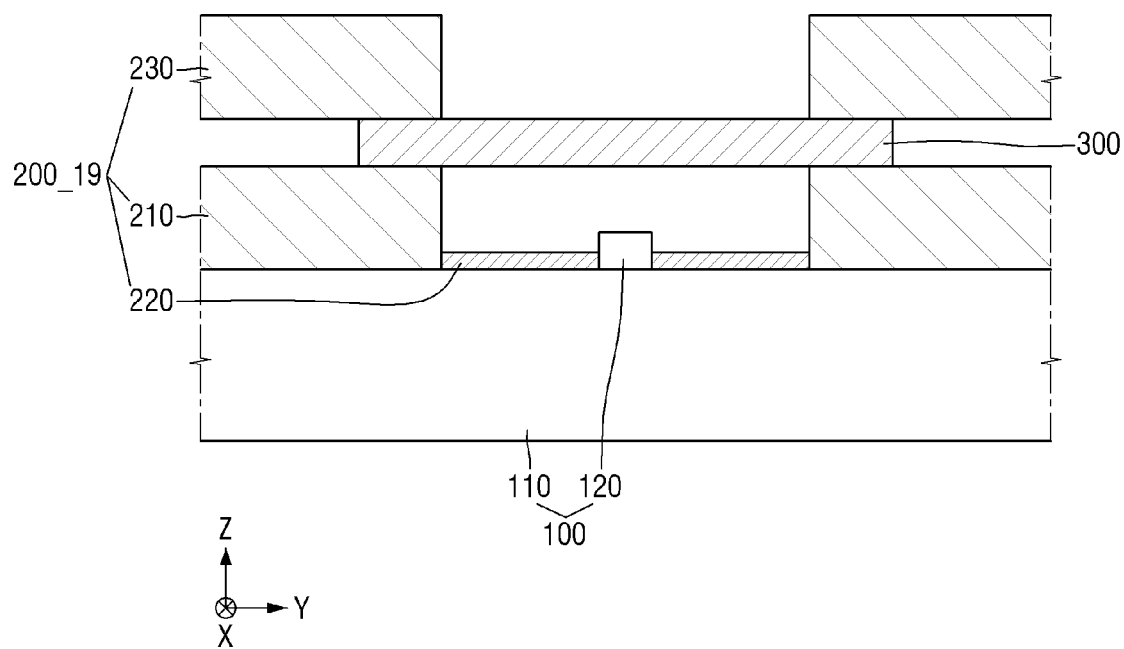
FIG. 19 is a schematic cross-sectional view of a light source member, a reflective member and a wavelength filter layer according to an embodiment.

FIG. 19 is a schematic cross-sectional view of a light source member, a reflective member and a wavelength filter layer according to an embodiment. The embodiment of FIG. 19 is different from the embodiment of FIG. 17 in that the adhesive layer AM is not disposed between the first reflective film 210 and the second reflective film 230.

For example, the lower surface of the wavelength filter layer 300 may be disposed on the first reflective film 210. The lower surface of the wavelength filter layer 300 may be in contact with the upper surface of the first reflective film 210. The second reflective film 230 may be disposed on the wavelength filter layer 300. The upper surface of the wavelength filter layer 300 may be in contact with the lower surface of the second reflective film 230. A width at which the lower surface of the wavelength filter layer 300 may be in direct contact with the upper surface of the first reflective film 210 may be the same as a width at which the upper surface of the wavelength filter layer 300 may be in direct contact with the lower surface of the second reflective film 230.

In the embodiment, although there is no adhesive layer between the first reflective film 210, the second reflective film 230 and the wavelength filter layer 300, the first reflective film 210 and the second reflective film 230 are disposed to overlap each other in the third direction Z, and the wavelength filter layer 300 is disposed between the first reflective film 210 and the second reflective film 230, thereby fixing the wavelength filter layer 300. Although not shown, the first reflective film 210 and the second reflective film 230 may be fixed with an adhesive or the like on an edge portion of a separation space between the first reflective film 210 and the second reflective film 230 in the third direction Z. Without being limited thereto, the first reflective film 210 and the second reflective film 230 may be fixed to the sidewall (not shown) of the housing through an adhesive tape (not shown).

Figure 20:
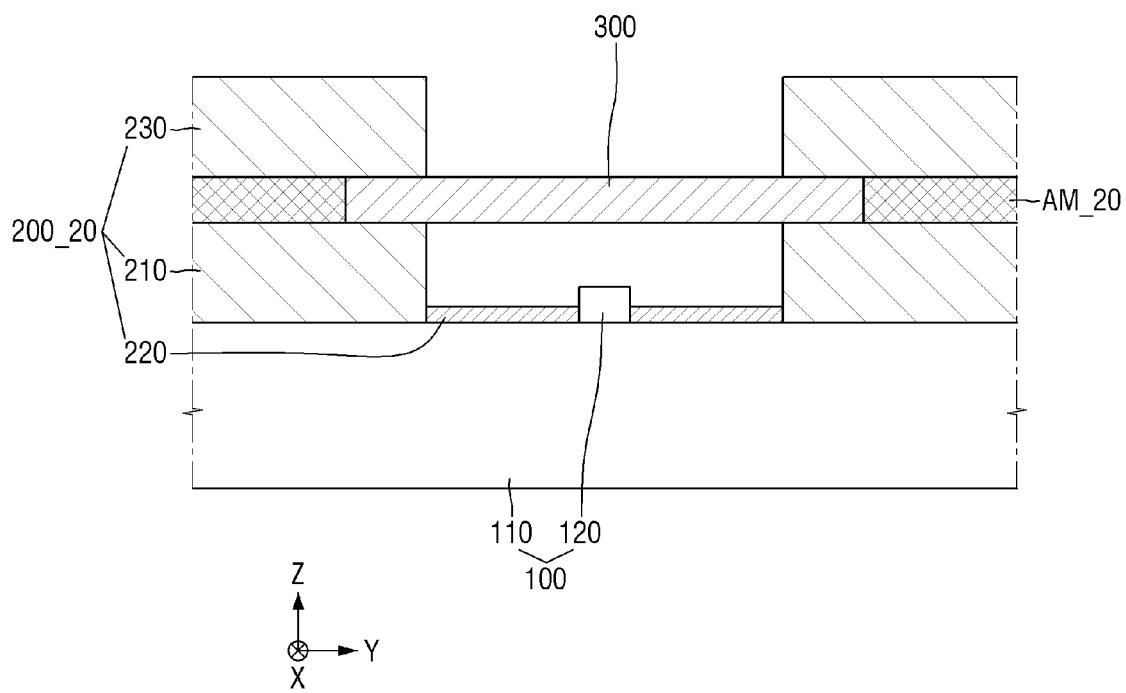
FIG. 20 is a schematic cross-sectional view of a light source member, a reflective member and a wavelength filter layer according to an embodiment.

FIG. 20 is a schematic cross-sectional view of a light source member, a reflective member and a wavelength filter layer according to an embodiment. The embodiment of FIG. 20 is different from the embodiment of FIG. 19 in that an adhesive layer AM_20 may be disposed between the first reflective film 210 and the second reflective film 230.

For example, the adhesive layer AM_20 may be disposed on the first reflective film 210. The lower surface of the adhesive layer AM_20 and the upper surface of the first reflective film 210 may be in contact with each other. The adhesive layer AM_20 may be disposed in a region where the first reflective film 210 and the wavelength filter layer 300 do not overlap each other in the third direction Z. Therefore, the plane on which the lower surface of the adhesive layer AM_20 may be located and the plane on which the lower surface of the wavelength filter layer 300 may be located may be substantially the same plane.

The second reflective film 230 may be disposed on the adhesive layer AM_20. The upper surface of the adhesive layer AM_20 may be in contact with the lower surface of the second reflective film 230. The adhesive layer AM_20 may be in contact with the lower surface of the second reflective film 230 in a region where the second reflective film 230 and the wavelength filter layer 300 do not overlap each other in the third direction Z. Therefore, the plane on which the upper surface of the adhesive layer AM_20 may be located and the plane on which the upper surface of the wavelength filter layer 300 may be located may be substantially the same plane.

The side surface of the adhesive layer AM_20 may be in contact with the side surface of the wavelength filter layer 300. That is, the wavelength filter layer 300 and the adhesive layer AM_20 may completely cover the upper surface of the first reflective film 210 exposed by the wavelength filter layer 300.

In the embodiment, the adhesive layer AM_20 may be disposed between the first reflective film 210 and the second reflective film 230, not between the wavelength filter layer 300 and the first and second reflective films 210 and 230, thereby fixing the wavelength filter layer 300 to the first reflective film 210 and the second reflective film 230 with a sandwich structure or other suitable layered structure.

Figure 21:
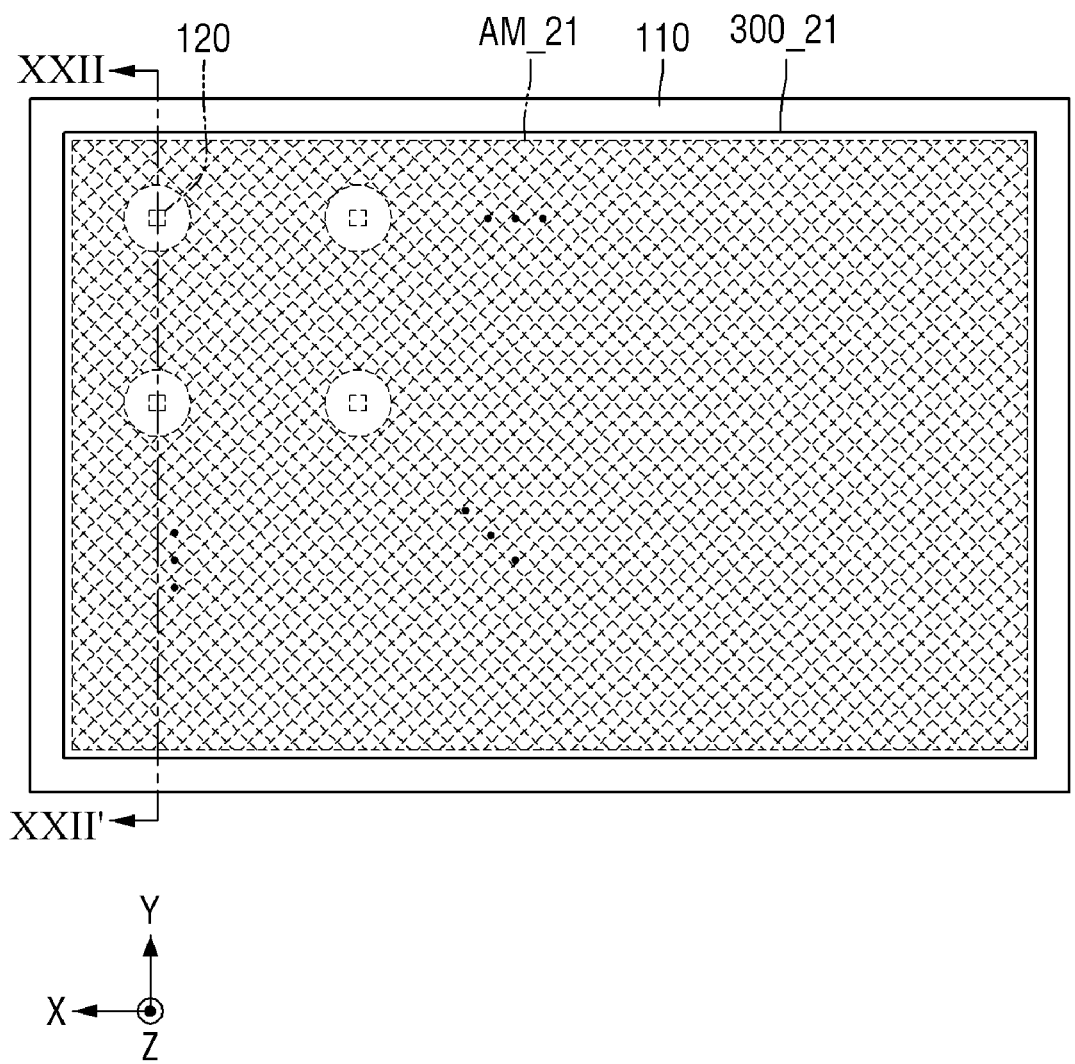
FIG. 21 is a layout diagram showing a relative positional relationship among light sources of a light source member, a reflective member and a wavelength filter layer according to an embodiment.
Figure 22:
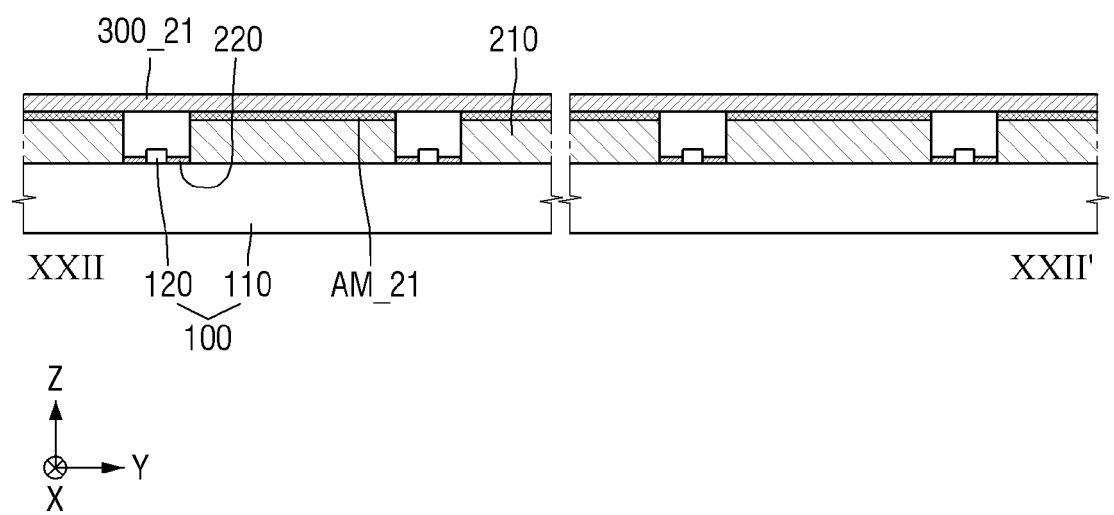
FIG. 22 is a schematic cross-sectional view taken along line XXII-XXII' of FIG. 21.

FIG. 21 is a layout diagram showing a relative positional relationship among light sources, a reflective member and a wavelength filter layer according to an embodiment. FIG. 22 is a schematic cross-sectional view of light sources, a reflective film and a wavelength filter layer taken along line XXII-XXII' of FIG. 21.

Referring to FIGS. 21 and 22, the embodiment is different from the embodiment of FIG. 3 in that a wavelength filter layer 300_21 may be disposed on the entire surface of the reflective film 210 to include all of the light sources 120 disposed on the first substrate 110.

For example, the wavelength filter layer 300_21 may be disposed on the reflective film 210 to include all of the light sources 120 disposed below the wavelength filter layer 300_21. Accordingly, the wavelength filter layer 300_21 may be disposed to overlap all of the light sources 120 disposed on the first substrate 110.

As shown in FIG. 22, the wavelength filter layer 30021 may be disposed to overlap the upper surface of the reflective film 210 disposed on the first substrate 110. The side surface of the wavelength filter layer 300_21 may overlap a portion of the reflective film 210 disposed on an edge portion of the upper surface of the first substrate 110 in the thickness direction. An adhesive layer AM_21 may be disposed between the reflective film 210 and the wavelength filter layer 300_21 disposed over the entire surface. Therefore, the adhesive layer AM_21 may be disposed over the entire region of the wavelength filter layer 30021 and the reflective film 210 in the third direction Z.

In the embodiment, since the wavelength filter layer 300_21 may be integrally formed without being patterned to correspond to the individual light sources 120, it is difficult to achieve a reduction in material cost according to the patterning. However, since the patterning process may be omitted, it may be advantageous in terms of process efficiency. The wavelength filter layer 300_21 partially blocks the heat that may be emitted from the light sources 120 from reaching the diffusion plate 400, which is vulnerable to heat and may be disposed above the wavelength filter layer 300_21. Thus, it may also be possible to prevent the diffusion plate 400, which is vulnerable to heat, from being damaged by heat generated from the light sources 120.

Figure 23:
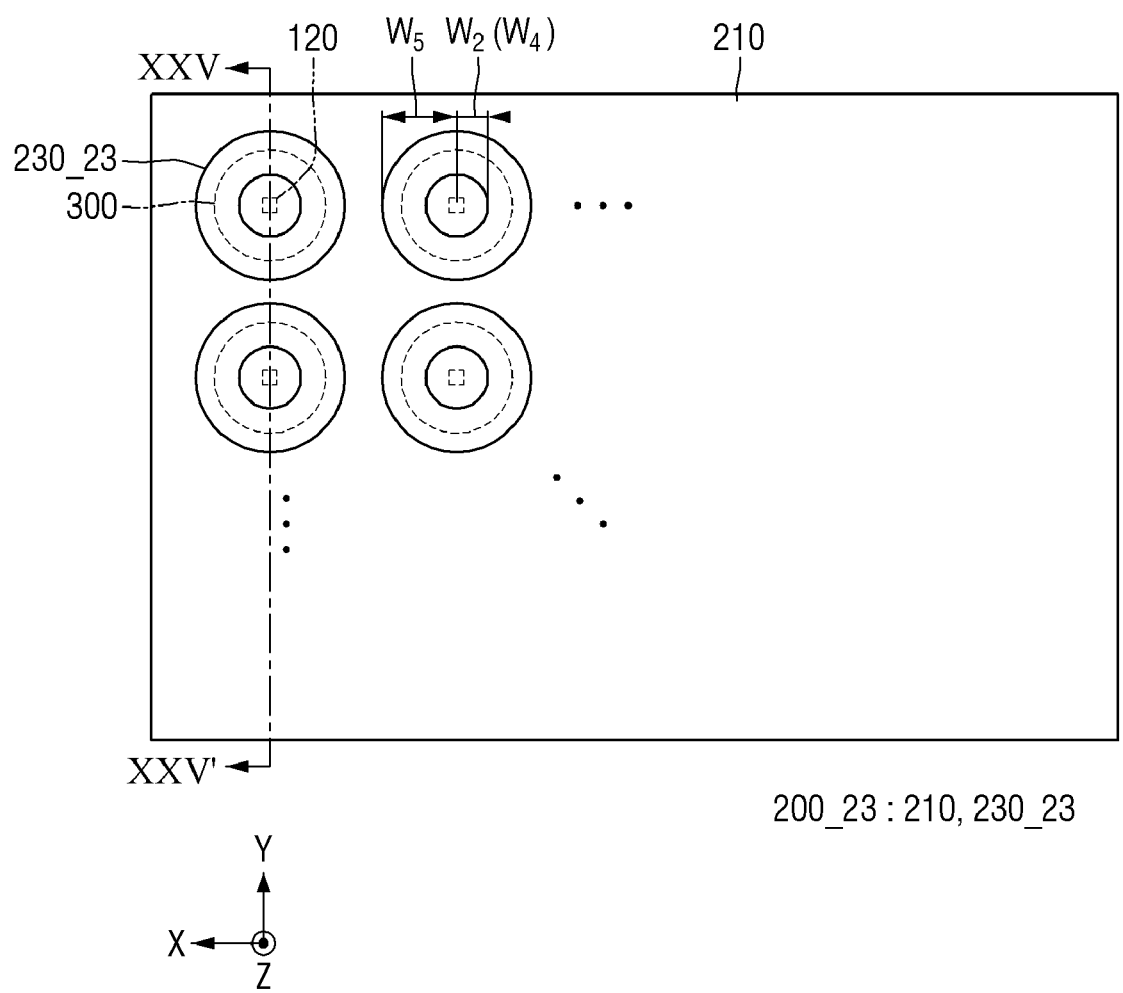
FIG. 23 is a layout diagram showing a relative positional relationship among light sources of a light source member, a reflective member and a wavelength filter layer according to an embodiment.
Figure 24:
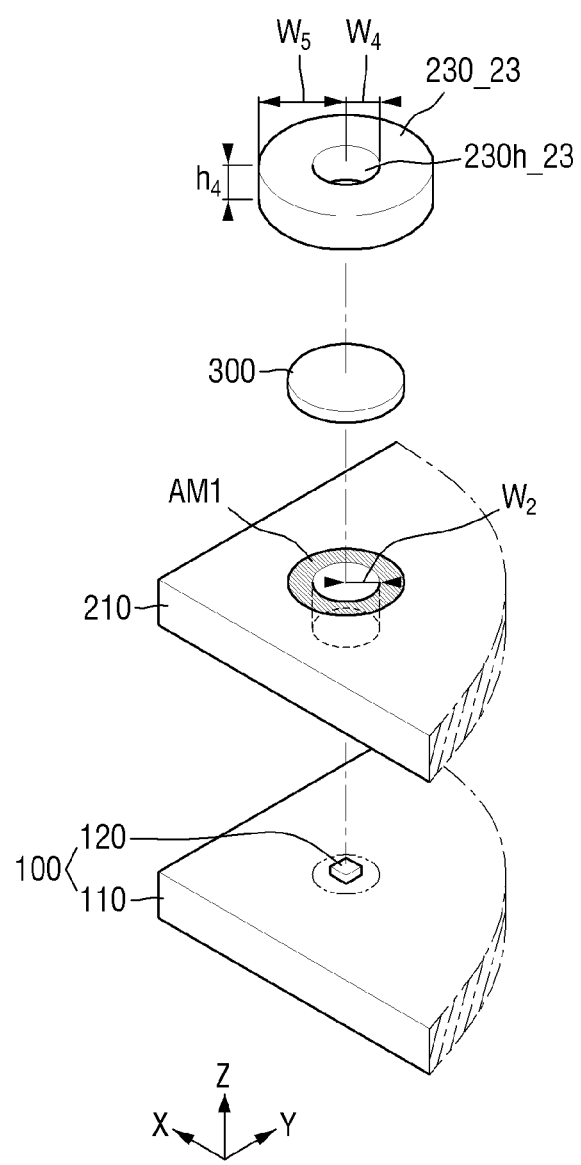
FIG. 24 is an exploded perspective view showing a portion of the backlight unit corresponding to one light source according to an embodiment.
Figure 25:
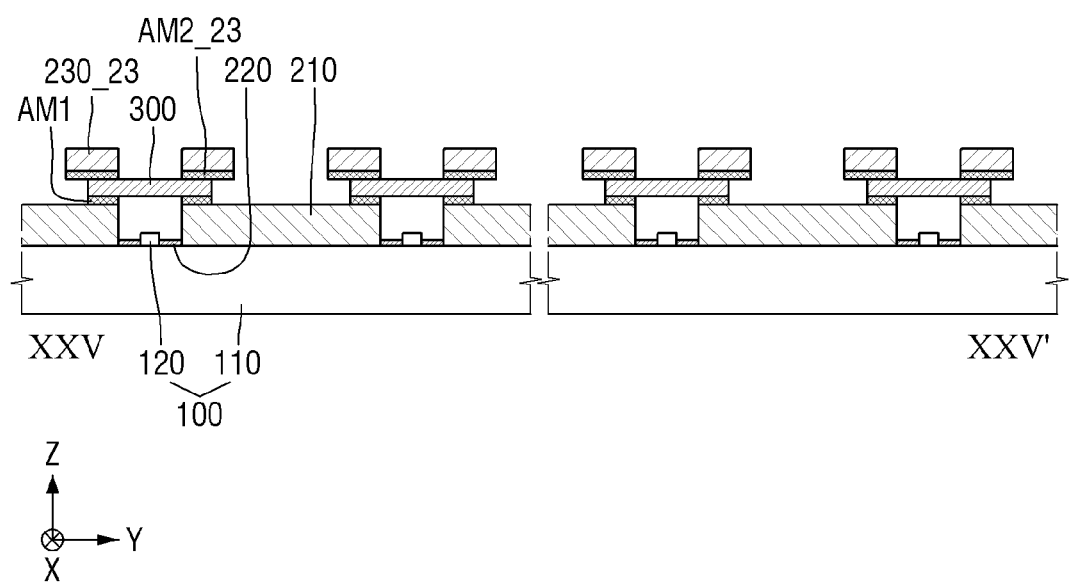
FIG. 25 is a schematic cross-sectional view of a light source member, a reflective member and a wavelength filter layer according to an embodiment.
Figure 26:
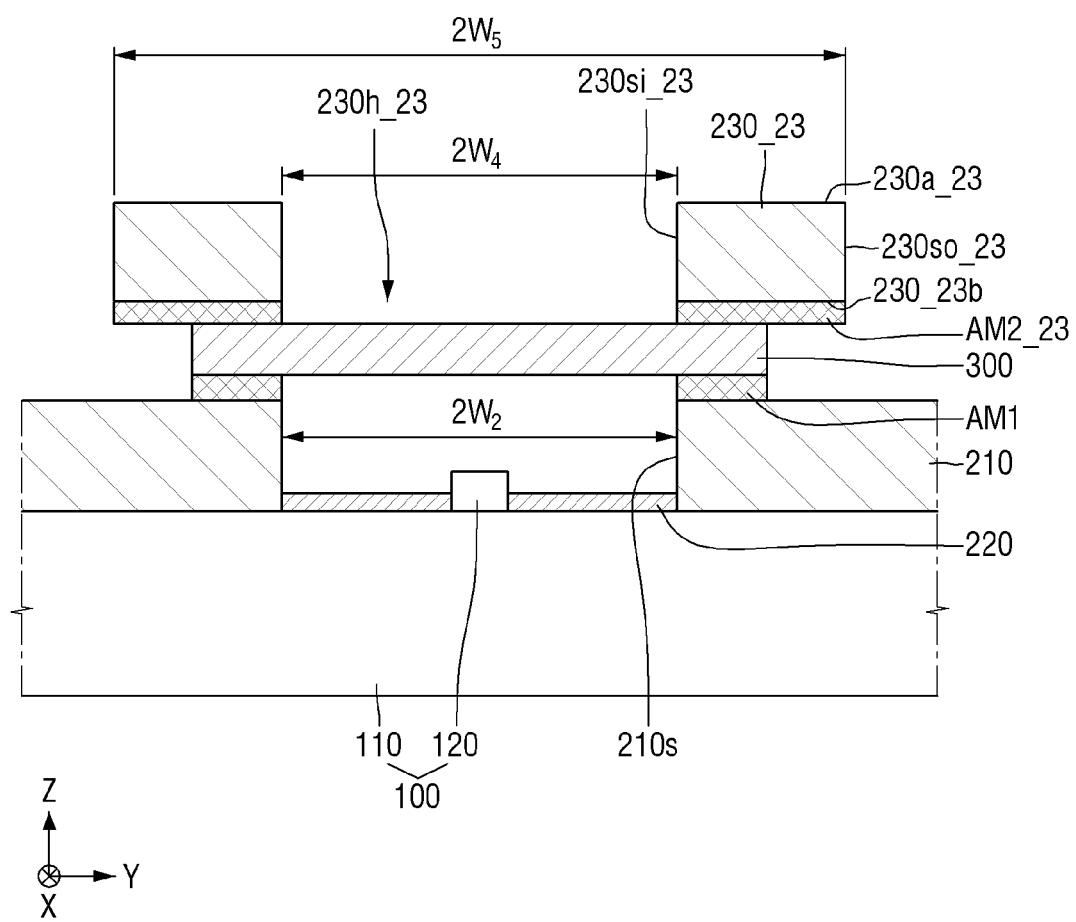
FIG. 26 is a schematic cross-sectional view of a light source member, a reflective member and a wavelength filter layer according to an embodiment.

FIG. 23 is a layout diagram showing a relative positional relationship among light sources, a first reflective film, a second reflective film and a wavelength filter layer according to an embodiment. FIG. 24 is an exploded perspective view showing a relative positional relationship among a light source member, a reflective member and a wavelength filter layer corresponding to one light source according to an embodiment. FIG. 25 is a schematic cross-sectional view taken along line XXV-XXV' of FIG. 23. FIG. 26 is an enlarged view of a portion where one light source is disposed in the schematic cross-sectional view of FIG. 25. FIGS. 24 and 26 illustrate a portion of the backlight unit 10 disposed corresponding to one light source 120.

The embodiment of FIGS. 23 to 26 is different from the embodiment of FIG. 3 in that a portion of the backlight unit 10 includes a second reflective film 230_23 patterned on the upper surface of the wavelength filter layer 300. In the embodiment, a reflective member 200_23 includes a first reflective film 210, a reflective coating layer 220 and a second reflective film 230_23. In terms of arrangement of the respective components, in this embodiment, the reflective film 210 of FIG. 3 may be replaced with the first reflective film 210 and the opening 210h of FIG. 3 may be replaced with a first opening 210h.

Referring to FIGS. 23 to 26, the second reflective film 230_23 may include second reflective films 230_23. Each of the second reflective films 230_23 may include a second opening 230h_23. The second opening 230h_23 may be formed to completely pass through the second reflective film 230_23. The second opening 230h_23 may have a cylindrical shape having a predetermined radius $W_4$ and a predetermined height $h_4$. The height $h_4$ of the second opening 230h_23 may be equal to the height $h_4$ of the second reflective film 230_23. The second reflective film 23023 may be shaped such that the cylindrical second opening 230h_23 having the predetermined radius $W_4$ and the predetermined height $h_4$ may be disposed in a cylindrical shape having a predetermined radius $W_5$ and a predetermined height $h_4$. The second reflective film 230_23 may have a substantially annular shape, for example, a donut or torus shape having an outer diameter $W_5$ and an inner diameter $W_4$ in plan view. However, without being limited thereto, the planar shape of the second reflective film 230_23 may have other shapes such as a square, an ellipse and a rectangle, and the planar shape of the second opening 230h_23 may be one of shapes such as a square, an ellipse and a rectangle, which is different from the planar shape of the second reflective film 230_23.

The second reflective film 230_23 including the second opening 230_23h may be disposed on the upper surface of the wavelength filter layer 300. That is, the second reflective films 230_23 may be disposed corresponding to the individual light sources 120, respectively.

A width $2W_5$ of the second reflective film 230_23 may be larger than the width $2W_3$ of the wavelength filter layer 300, and a width $2W_4$ of the second opening 230h_23 may be equal to the width $2W_3$ of the first opening 210h. That is, the second opening 230h_23 may have the same area as that of the first opening 210h. Accordingly, the second reflective film 230_23 may be disposed to surround the light source 120 in plan view such that the light source may be completely exposed in the third direction Z by the second opening 230h_23.

Referring to FIG. 26, the second reflective film 230_23 includes an inner side surface 230si_23 forming the second opening 230h_23 and an outer side surface 230so_23 disposed on the outer side of the second opening 230h_23 in schematic cross-sectional view. The inner side surface 230si_23 of the second reflective film 230_23 may be aligned in parallel with the plane including an inner side surface 210si of the first reflective film 210 in the third direction Z. The outer side surface 230so_23 of the second reflective film 230_23 may be disposed to extend more outward than the side surface of the wavelength filter layer 300. The second reflective film 230_23 may overlap a portion of the first reflective film 210 in the thickness direction Z.

Figure 27:
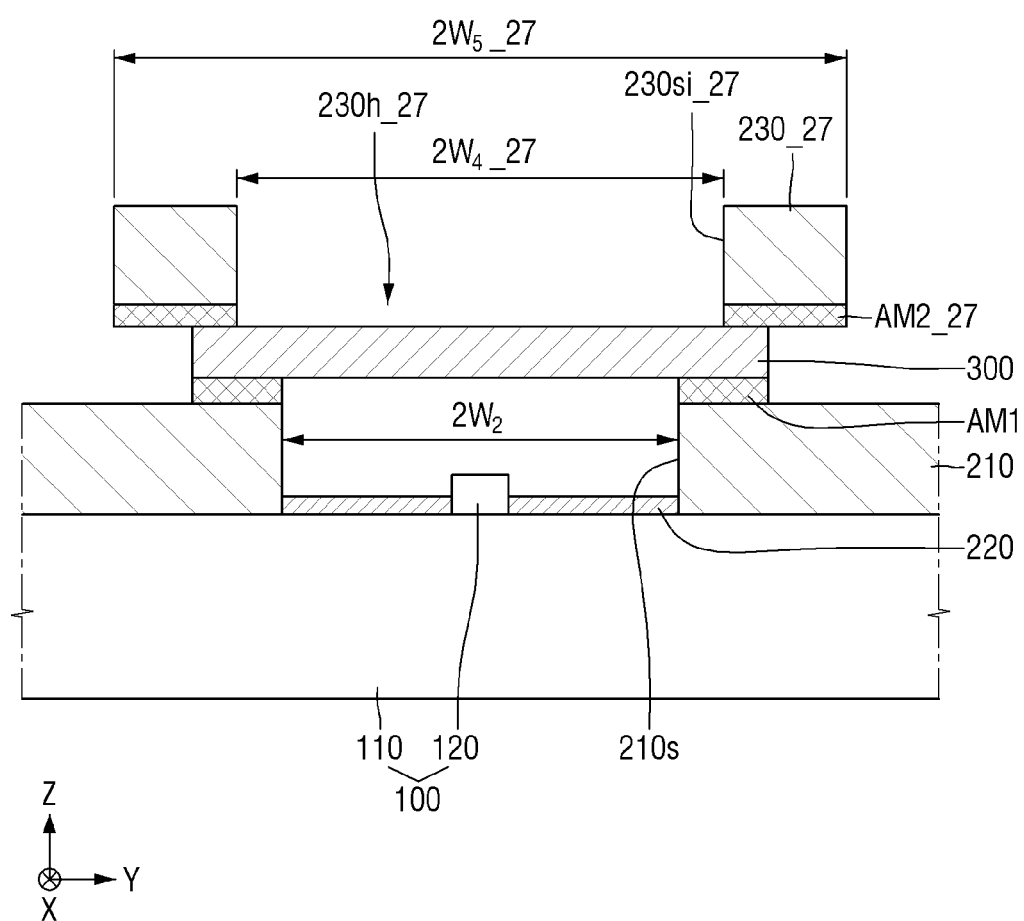
FIG. 27 is a schematic cross-sectional view of a light source member, a reflective member and a wavelength filter layer according to an embodiment.

FIG. 27 is a schematic cross-sectional view of a light source member, a reflective member and a wavelength filter layer according to an embodiment.

The embodiment of FIG. 27, which shows a portion of the backlight unit 10, is different from the embodiment of FIG. 26 in that a width $2W_4\_27$ of a second opening 230h_27 formed in a second reflective film 230_27 is different from the width $2W_2$ of the first opening 210 formed in the first reflective film 210.

For example, referring to FIG. 27, the width $2W_4\_27$ of the second opening $230h\_27$ formed in the second reflective film $230\_27$ may be different from the width $2W_2$ of the first opening 210 formed in the first reflective film 210. The width $2W_4\_27$ of the second opening $230h\_27$ formed in the second reflective film $230\_27$ may be larger than the width $2W_2$ of the first opening 210 formed in the first reflective film 210. Therefore, the second reflective film $230\_27$ including the second opening $230h\_27$ may expose at least a portion of the wavelength filter layer 300 which overlaps the first reflective film 210 in the third direction Z.

As illustrated in the figures, adhesive layers AM1 and AM2_27 may be disposed between the first reflective film 210 and the wavelength filter layer 300 and between the second reflective film $230\_27$ and the wavelength filter layer 300, thereby fixing the first reflective film 210, the wavelength filter layer 300 and the second reflective film $230\_27$. However, the disclosure is not limited thereto, and the adhesive layers AM1 and AM2_27 may not be disposed between the first reflective film 210, the second reflective film $230\_27$ and the wavelength filter layer 300.

Figure 28:
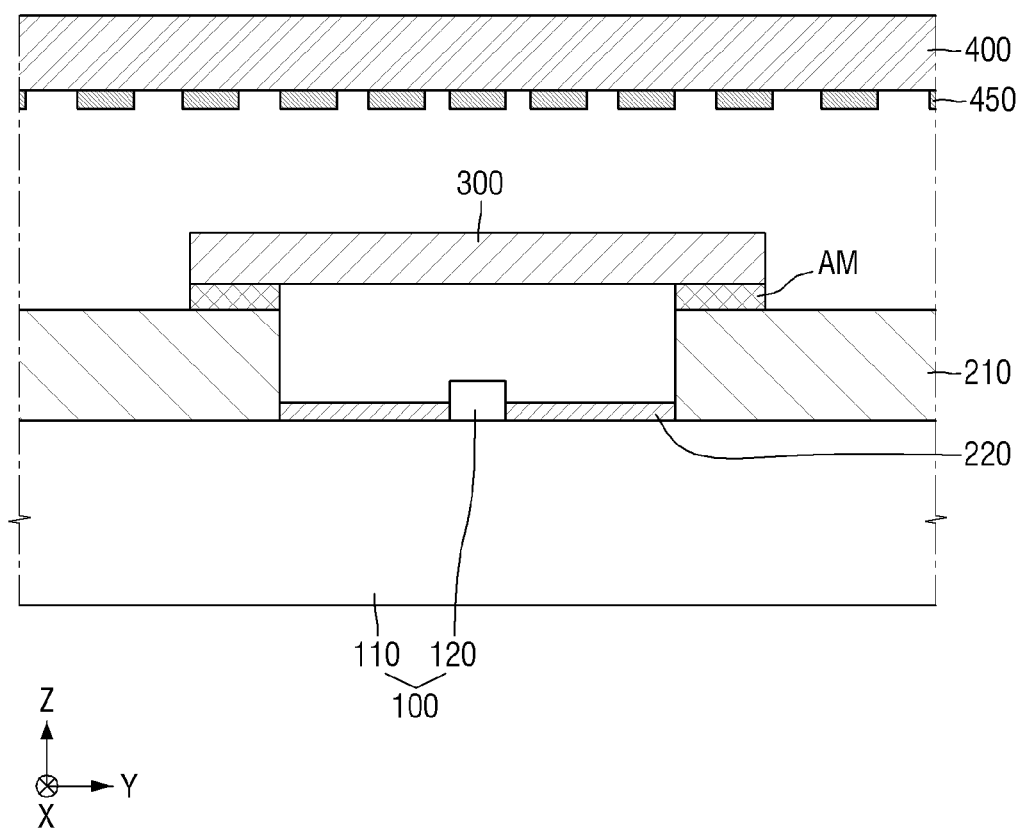
FIG. 28 is a schematic cross-sectional view of a light source member, a reflective member, a wavelength filter layer and a diffusion plate according to an embodiment.

FIG. 28 is a schematic cross-sectional view of a light source member, a reflective member, a wavelength filter layer and a diffusion plate according to an embodiment.

A plurality of reflective patterns 450 may be disposed between the diffusion plate 400 and the wavelength filter layer 300 in the backlight unit 10 according to the embodiment. In one embodiment, the reflective patterns 450 may be reflective ink patterns formed of ink, or other suitable reflective material. In another embodiment, the reflective patterns 450 may be in the form of a film.

The reflective patterns 450 may be formed on the lower surface of the diffusion plate 400. The reflective patterns 450 may have the same width. However, the disclosure is not limited thereto, and the reflective patterns 450 may have different widths.

The reflective patterns 450 may be formed on the diffusion plate 400 by a printing method or the like. The reflective patterns 450 may be made of a material having a reflective property, for example, metal, titanium oxide ($TiO_2$), dichroic dye, or other suitable material. However, the disclosure is not limited thereto.

The reflective patterns 450 may be disposed to be separated from each other in the second direction Y. The separation distances between the reflective patterns 450 in the second direction Y may be different from each other. In one embodiment, an interval between the reflective patterns 450 at a first distance from the light source 120 may be different than an interval between the reflective patterns 450 at a second distance from the light source 120. The second distance may be greater than the first distance. The interval between the reflective patterns 450 at the first distance from the light source 120 may be smaller than the interval between the reflective patterns 450 at the second distance from the light source 120. Therefore, the interval between the reflective patterns 450 may increase as the distance from the corresponding light source 120 increases.

By arranging each of the reflective patterns 450 such that the interval between the reflective patterns 450 increases as the distance from the corresponding light source 120 increases, the light emitted from the light source 120 and emitted from the wavelength filter layer 300 may have the lowest light transmittance at the center of the opening $210h$ and may have the highest light transmittance at an edge portion where the reflective film 210 is disposed.

The reflective patterns 450 disposed on the lower surface of the diffusion plate 400 serve to prevent most of the light emitted from the light source 120 from traveling vertically upward to be incident on the display panel 70. Therefore, the light emitted from the light source 120 can be provided to the display panel 70 with a more uniform luminance.

In concluding the detailed description, those skilled in the art will appreciate that many variations and modifications can be made to the above embodiments without substantially departing from the principles of the invention. Therefore, the disclosed embodiments of the invention are used in a generic and descriptive sense only and not for purposes of limitation.

What is claimed is:

1. A backlight unit comprising:
a substrate;
a plurality of light sources disposed on one surface of the substrate;
a first reflective film disposed on one surface of the substrate and including first openings, each of the first openings of the first reflective film exposing each of the light sources;
a plurality of wavelength filter layers disposed above the first reflective film and disposed to correspond to the first openings of the first reflective film, wherein
the plurality of wavelength filter layers are spaced apart from each other, and each of the wavelength filter layers covers at least one of the first openings of the first reflective film,
wherein
the wavelength filter layers have a different transmittance according to a wavelength of incident light and an incident angle with respect to a normal direction,
the light sources emit light in a first wavelength band, and
the wavelength filter layers have first transmittance for light in a first incident angle range and a second transmittance larger than the first transmittance for light in a second incident angle range larger than the first incident angle range,
the backlight unit further comprising:
a wavelength conversion film disposed above the wavelength filter layers to convert light of the first wavelength band into light of a second wavelength band different from the first wavelength band.

2. The backlight unit of claim 1, wherein the first incident angle range is from about 0 degrees to about 40 degrees, and the second incident angle range is from about 55 degrees to about 70 degrees.

3. The backlight unit of claim 2, wherein the first transmittance is in a range of about 0% to about 10%, and the second transmittance is in a range of about 50% to about 70%.

4. The backlight unit of claim 3, wherein the light sources are configured such that a luminance in the normal direction is larger than a luminance in an inclined direction.

5. The backlight unit of claim 1, wherein light emitted to the light sources has an optical path within an orientation angle range of the light sources, and
in the optical path, a reference path line, which has a maximum angle from a reference line vertically passing through a center of at least one of the light sources, passes through at least one of the wavelength filter layers.

6. The backlight unit of claim 1, wherein the wavelength filter layers include a first refractive layer and a second refractive layer which are alternately stacked, and
a first refractive index of the first refractive layer is different from a second refractive index of the second refractive layer.

7. The backlight unit of claim 1, wherein widths of the wavelength filter layers are larger than widths of the first openings to cover the first openings.

8. The backlight unit of claim 1, wherein the wavelength filter layers completely cover the first openings, and overlap the first reflective film around the first openings.

9. The backlight unit of claim 1, further comprising:
an adhesive layer interposed between the wavelength filter layers and the first reflective film.

10. The backlight unit of claim 1, wherein the first openings surround each of the light sources, and a thickness of the first reflective film is larger than a thickness of the light source.

11. The backlight unit of claim 1, wherein a separation distance between the wavelength filter layers adjacent to each other is larger than a width of each of the wavelength filter layers.

12. The backlight unit of claim 1, further comprising:
a second reflective film disposed above the wavelength filter layers and including second openings overlapping the first openings.

13. The backlight unit of claim 1, further comprising:
a diffusion plate disposed above the wavelength filter layers.

14. The backlight unit of claim 13, further comprising:
a plurality of reflective patterns disposed on a lower surface of the diffusion plate,
wherein an interval between the reflective patterns at a first distance from the light sources is smaller than an interval between the reflective patterns at a second distance, which is greater than the first distance, from the light sources.

15. A display device comprising:
a backlight unit including:
a substrate;
LED chips disposed on one surface of the substrate to emit light;
a reflective film disposed on one surface of the substrate and including openings, each of the openings exposing each of the LED chips;
a plurality of wavelength filter layers disposed above the reflective film and corresponding to the openings of the reflective film; and
a wavelength conversion film disposed above the wavelength filter layers and converting the light from the LED chips into light of different wavelengths; and
a display panel disposed above the backlight unit, wherein
the plurality of wavelength filter layers are spaced apart from each other, and each of the wavelength filter layers covers at least one of the openings of the reflective film, and
the wavelength filter layers have a different transmittance according to a wavelength of incident light and an incident angle with respect to a normal direction,
the light sources emit light in a first wavelength band, and
the wavelength filter layers have first transmittance for light in a first incident angle range and a second transmittance larger than the first transmittance for light in a second incident angle range larger than the first incident angle range.

16. The display device of claim 15, wherein the wavelength filter layer transmits the blue light, which is incident at an incident angle of about 0 degrees to about 40 degrees, in a range of about 0% to about 10% and transmits the blue light, which is incident at an angle of about 55 degrees to about 70 degrees, in a range of about 50% to about 70%.

17. The display device of claim 15, wherein a width of the wavelength filter layer is larger than a width of the opening, and
wherein the wavelength filter layer completely covers the opening and overlaps the reflective film around the opening.

* * * * *